United States Patent
Yamanaka

(10) Patent No.: US 10,836,113 B2
(45) Date of Patent: Nov. 17, 2020

(54) LASER WELDING MEMBER, AND MOLDED ARTICLE

(71) Applicant: Mitsubishi Engineering-Plastics Corporation, Minato-ku (JP)

(72) Inventor: Yasushi Yamanaka, Hiratsuka (JP)

(73) Assignee: Mitsubishi Engineering-Plastics Corporation, Minato-ku (JP)

(*) Notice: Subject to any disclaimer, the term of this patent is extended or adjusted under 35 U.S.C. 154(b) by 128 days.

(21) Appl. No.: 15/542,512

(22) PCT Filed: Jan. 18, 2016

(86) PCT No.: PCT/JP2016/051252
§ 371 (c)(1),
(2) Date: Jul. 10, 2017

(87) PCT Pub. No.: WO2016/117493
PCT Pub. Date: Jul. 28, 2016

(65) Prior Publication Data
US 2018/0264743 A1    Sep. 20, 2018

(30) Foreign Application Priority Data

Jan. 22, 2015 (JP) ................................ 2015-009979
Feb. 25, 2015 (JP) ................................ 2015-034733

(51) Int. Cl.
*B29C 65/16* (2006.01)
*B29C 65/00* (2006.01)
(Continued)

(52) U.S. Cl.
CPC ...... *B29C 65/1616* (2013.01); *B29C 45/0001* (2013.01); *B29C 65/1635* (2013.01);
(Continued)

(58) Field of Classification Search
CPC . B29C 65/16; B29C 65/1603; B29C 65/1612; B29C 65/1616; B29C 65/1635;
(Continued)

(56) References Cited

U.S. PATENT DOCUMENTS 6,433,046 B1 *    8/2002   Campbell ............ C08K 5/0066
                                                              524/100
7,960,003 B2      6/2011   Kihara et al.
(Continued)

FOREIGN PATENT DOCUMENTS

DE    10330722 A1 *  2/2005  .......... C08L 2666/18
JP    3510817 B2     3/2004
(Continued)

OTHER PUBLICATIONS

BASF, Ultradur Lux PBT Technical Data Sheet (no date).*
(Continued)

*Primary Examiner* — Kregg T Brooks
(74) *Attorney, Agent, or Firm* — Oblon, McClelland, Maier & Neustadt, L.L.P.

(57) ABSTRACT

A laser welding member that has a high laser transmittance at a welding region and exhibits an excellent laser welding processability, and a molded article obtained by laser welding using this laser welding member. The laser welding member is obtained by injection molding of a thermoplastic polyester resin material, wherein a region to be laser welded in the member is at a location separated by a distance of at least 15 mm from a gate of an injection molding mold and has at least 30% of a light transmittance of laser light with a wavelength of 940 nm.

7 Claims, 2 Drawing Sheets

(51) Int. Cl.
*B29C 69/00* (2006.01)
*B29C 65/82* (2006.01)
*C08L 67/02* (2006.01)
*B29C 45/00* (2006.01)
*B32B 27/08* (2006.01)
*B32B 27/36* (2006.01)
*B29K 67/00* (2006.01)
*B29K 69/00* (2006.01)
*B29K 667/00* (2006.01)
*B29K 669/00* (2006.01)

(52) U.S. Cl.
CPC ...... *B29C 65/1654* (2013.01); *B29C 65/1677* (2013.01); *B29C 65/8215* (2013.01); *B29C 65/8253* (2013.01); *B29C 66/1122* (2013.01); *B29C 66/43* (2013.01); *B29C 66/71* (2013.01); *B29C 66/73921* (2013.01); *B29C 69/00* (2013.01); *B32B 27/08* (2013.01); *B32B 27/365* (2013.01); *C08L 67/02* (2013.01); *B29C 45/0025* (2013.01); *B29C 66/7352* (2013.01); *B29C 66/919* (2013.01); *B29C 66/929* (2013.01); *B29C 66/939* (2013.01); *B29C 2045/0027* (2013.01); *B29K 2067/006* (2013.01); *B29K 2069/00* (2013.01); *B29K 2667/006* (2013.01); *B29K 2669/00* (2013.01); *B29K 2995/0027* (2013.01)

(58) Field of Classification Search
CPC ..... B29C 66/1122; B29C 66/43; B29C 66/71; B29C 66/73921; B32B 27/08; B32B 27/36; B32B 27/365; C08L 67/02
See application file for complete search history.

(56) References Cited

U.S. PATENT DOCUMENTS

| | | | |
|---|---|---|---|
| 7,960,012 B2 | 6/2011 | Kihara et al. | |
| 2004/0261940 A1 | 12/2004 | Arai et al. | |
| 2005/0119377 A1 | 6/2005 | Ishii et al. | |
| 2005/0167025 A1* | 8/2005 | Kobayashi | B29C 66/1282 156/64 |
| 2007/0129475 A1 | 6/2007 | Sakata et al. | |
| 2009/0314476 A1 | 12/2009 | Fujikawa | |
| 2010/0233474 A1 | 9/2010 | Haruhara et al. | |
| 2011/0007410 A1* | 1/2011 | Honma | C08L 67/02 359/838 |
| 2012/0270987 A1* | 10/2012 | von Benten | B29C 65/1616 524/429 |
| 2014/0179855 A1* | 6/2014 | Farrell | C08L 67/02 524/494 |
| 2015/0037525 A1 | 2/2015 | Maeda et al. | |

FOREIGN PATENT DOCUMENTS

| | | | | |
|---|---|---|---|---|
| JP | 2004-291344 A | 10/2004 | | |
| JP | 2004-315805 A | 11/2004 | | |
| JP | 2007-246716 A | 9/2007 | | |
| JP | 2008-1112 A | 1/2008 | | |
| JP | 2008-106217 A | 5/2008 | | |
| JP | 2008-133341 A | 6/2008 | | |
| JP | 2010-24396 A | 2/2010 | | |
| JP | 2011-5704 A | 1/2011 | | |
| WO | WO 2005/035657 A1 | 4/2005 | | |
| WO | WO-2005035657 A1 * | 4/2005 | | B29C 66/71 |
| WO | WO 2007/077794 A1 | 7/2007 | | |
| WO | WO 2008/105167 A1 | 9/2008 | | |
| WO | WO 2008/152909 A1 | 12/2008 | | |
| WO | WO 2013/147044 A1 | 10/2013 | | |

OTHER PUBLICATIONS

Bayer Material Science, Optical Properties of Makrolon and Apec for Non-Imaging Properties (no date).*
Partial machine translation of JP 2011-005704 A.*
Partial machine translation of JP 2010-024396 A (2020).*
Partial machine translation of DE-10330722-A1 (2020).*
Extended European Search Report dated Mar. 6, 2018 in European Patent Application No. 16740100.9, 10 pages.
International Search Report dated Mar. 15, 2016, in PCT/JP2016/051252 filed Jan. 18, 2016.
Japanese Office Action dated Oct. 9, 2018 in Japanese Patent Application No. 2015-034733 (with unedited computer generated English translation), 6 pages.

* cited by examiner

LASER WELDING MEMBER, AND MOLDED ARTICLE

TECHNICAL FIELD

The present invention relates to a laser welding member and a molded article. The present invention more particularly relates to a laser welding member that has a high laser transmittance and exhibits an excellent laser welding processability, and to a molded article obtained by laser welding using this laser welding member.

BACKGROUND ART

Based on the pursuit of weight reduction and environmental considerations such as recycling, a conversion to plastic of components for which metal has heretofore been used and the downsizing of plastic products have been advancing in recent years with regard to automotive components and components for consumer products. Thermoplastic polyester resins exhibit an excellent mechanical strength, chemical resistance, electrical insulation property, and so forth and also have an excellent heat resistance, moldability, and recyclability, and for these reasons are widely used in a variety of equipment components. Thermoplastic polyester resins such as polybutylene terephthalate resin in particular exhibit an excellent mechanical strength and moldability and can also be made flame retardant, and for these reasons are widely used, for example, in electrical and electronic components where fire safety is required.

In addition, with regard to the production of these equipment components, there has quite recently been an increase in examples of the use, in order to improve the production efficiency, of welding processes in order to effect component-to-component joining, whereamong laser welding, which has little effect on electronic components, is frequently used.

However, thermoplastic polyester resins and particularly polybutylene terephthalate resin have lower laser transparencies than, e.g., polycarbonate resins and polystyrenic resins, and hence have a poorer laser welding processability and are prone to provide an unsatisfactory weld strength. They may thus be regarded as unsuitable as laser welding resin materials.

A method has been proposed (PTL 1) that uses a copolymerized polybutylene terephthalate in order to improve the laser weldability of polybutylene terephthalate resin. However, in some instances this procedure has been unable to provide a satisfactory weldability due, for example, to gaps between welding members produced by, for example, warp deformation of the molded article. A method has also been proposed (PTL 2) in which the weldability is improved by addition of a laser transmission absorber such as nigrosine to thermoplastic resin.

In addition, flame-retarded polybutylene terephthalate resin in particular has a low laser transparency and its laser welding has often been highly problematic. PTL 3 proposes a method in which laser transparency is made to coexist with flame retardancy through the addition of a phosphinic acid to polybutylene terephthalate resin. However, a satisfactory weld strength is often not obtained due to a low laser transparency, the effects of warping of the molded article and so forth.

CITATION LIST

Patent Literature

[PTL 1] Japanese Patent 3,510,817
[PTL 2] Japanese Patent Application Laid-open No. 2008-1112
[PTL 3] WO 2007/77794

SUMMARY OF INVENTION

Technical Problem

Thus, various problems have frequently been associated with efforts to improve the laser welding processability by incorporating other components in thermoplastic polyester resins, e.g., polybutylene terephthalate resin and so forth. Welding members that are to be laser welded are frequently produced by injection molding, wherein molding is carried out by injecting the resin in a fluid state from a gate disposed in a cavity of the molding mold. In particular, efforts to reduce component weight and thickness have been making rapid progress quite recently, and this has led to easier generation of variability in the characteristics and performance as a function of location in a molded article.

Considering the circumstances described in the preceding, an object of (the problem for) the present invention is to provide a laser welding member that has a high laser transmittance and exhibits an excellent laser welding processability.

Solution to Problem

The present inventor carried out extensive investigations into the individual regions in the welding members provided by the injection molding of thermoplastic polyester resins and as a result discovered that an excellent laser transparency and an excellent laser welding processability can be realized by using a special region of the molded article for the welding region for laser welding. The present invention was achieved based on this discovery.

The present invention relates to the following laser welding member, molded article, and laser welding method.

[1] A laser welding member obtained by injection molding a thermoplastic polyester resin material, wherein a region to be laser welded in the member is at a location separated by a distance of at least 15 mm from a gate of an injection molding mold and has at least 30% of a light transmittance of laser light with a wavelength of 940 nm.

[2] The laser welding member according to [1], wherein the thermoplastic polyester resin material is injection molded under a condition of 10 to 300 $cm^3$/sec for an injection ratio defined as follows:

injection ratio: a volume of resin material injected per unit time into a mold cavity from an output nozzle of an injection molding machine.

[3] The laser welding member according to [1] or [2], wherein the thermoplastic polyester resin material is injection molded under a condition of 100 to 1200 $cm^3$/sec·cm for a surface advance coefficient defined as follows:

surface advance coefficient: a value obtained by dividing the injection ratio by the thickness of the mold cavity into which the resin material is injected.

[4] The laser welding member according to any of [1] to [3], wherein a melt volume rate (measured under a condition of 250° C. and a load of 5 kg) of the thermoplastic polyester resin material is at least 10 $cm^3$/10 min.

[5] The laser welding material according to any of [1] to [4], wherein the thermoplastic polyester resin material comprises a polybutylene terephthalate resin and/or a polyethylene terephthalate resin.

[6] The laser welding member according to any of [1] to [5], wherein the thermoplastic polyester resin material comprises a polybutylene terephthalate resin and a polyethylene terephthalate resin, and the content of the polyethylene terephthalate resin is 5 to 50 mass % relative to 100 mass % for a total of the polybutylene terephthalate resin and the polyethylene terephthalate resin.

[7] The laser welding member according to any of [1] to [6], wherein the thermoplastic polyester resin material comprises a polybutylene terephthalate homopolymer and a modified polybutylene terephthalate resin, and the content of the modified polybutylene terephthalate resin is 10 to 70 mass % relative to 100 mass % for a total of the polybutylene terephthalate resin and the modified polybutylene terephthalate resin.

[8] The laser welding member according to any of [1] to [4], wherein the thermoplastic polyester resin material comprises a polybutylene terephthalate resin and a polycarbonate resin, and the content of the polycarbonate resin is 10 to 50 mass % relative to 100 mass % for a total of the polybutylene terephthalate resin and the polycarbonate resin.

[9] The laser welding member according to any of [1] to [4], wherein the thermoplastic polyester resin material comprises a polybutylene terephthalate resin, polystyrene and/or butadiene rubber-containing polystyrene, and a polycarbonate resin, and contains 30 to 90 mass % of the polybutylene terephthalate resin, 1 to 50 mass % of the polystyrene and/or butadiene rubber-containing polystyrene, and 1 to 50 mass % of the polycarbonate resin, based on 100 mass % for a total of the polybutylene terephthalate resin, the polystyrene and/or butadiene rubber-containing polystyrene, and the polycarbonate resin.

[10] The laser welding member according to any of [1] to [9], which is used for a member on a laser-transmissive side.

[11] A molded article obtained by laser welding the first laser welding member according to any of [1] to [10] with a second member composed of a laser-absorptive resin material by irradiation with laser light from a side of the first laser welding member.

[12] A method of producing a laser-welded molded article by laser welding a first laser welding member obtained by injection molding a thermoplastic polyester resin material, with a second member composed of a laser-absorptive resin material by irradiation with laser light from a side of the first laser welding member, wherein a region to be laser welded in the first member is at a location separated by a distance of at least 15 mm from a gate of an injection molding mold and has at least 30% of a light transmittance of laser light with a wavelength of 940 nm.

Advantageous Effects of Invention

The laser welding member according to the present invention provided by the injection molding of a thermoplastic polyester resin material has a welding region that has a high laser transmittance and that exhibits an excellent laser welding processability, while welded articles obtained by laser welding of this welding member exhibit an excellent weld strength.

BRIEF DESCRIPTION OF DRAWINGS

FIG. 2 is a schematic diagram that shows the method for measuring the laser weld strength in the examples, wherein FIG. 2(a) is a diagram in which a laser-absorptive material and a transmissive material are viewed from the side and FIG. 2(b) is a diagram in which the same are viewed from above.

DESCRIPTION OF EMBODIMENTS

Figure 1:
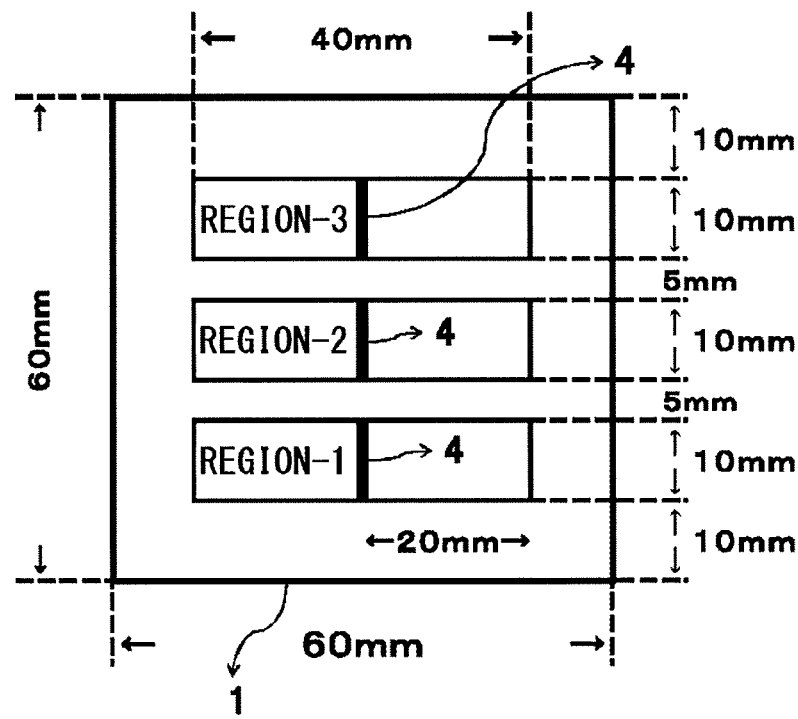
FIG. 1 is a plan view showing the locations, on an injection molded article, of transmissive materials 1 to 3 used in the examples.

The laser welding member according to the present invention is a laser welding member obtained by injection molding of a thermoplastic polyester resin material, wherein the region to be laser welded in the member is at a location separated by a distance of at least 15 mm from the gate of the injection molding mold, and has at least 30% of a light transmittance of laser light with a wavelength of 940 nm.

The present invention is described in detail in the following. The following description is provided based on exemplary embodiments and specific examples of the present invention, but the present invention is not to be interpreted as being limited to or by these embodiments and specific examples.

[Thermoplastic Polyester Resin Material]

Thermoplastic polyester resin is the main component of the resin material used for the laser welding member according to the present invention.

Thermoplastic polyester resins are polyesters obtained by, for example, polycondensation of a dicarboxylic acid compound with a dihydroxy compound, polycondensation of an oxycarboxylic acid compound, or polycondensation of these compounds, and may be a homopolyester or a copolyester.

Aromatic dicarboxylic acid or an ester-forming derivative thereof is preferably used as the dicarboxylic acid compound constituting the thermoplastic polyester resin.

The aromatic dicarboxylic acid can be exemplified by terephthalic acid, isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, diphenyl ether-4,4'-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'-dicarboxylic acid, and pyridine-2,5-dicarboxylic acid, while the use of terephthalic acid is preferred.

A mixture of two or more of these aromatic dicarboxylic acids may be used. As is well known, rather than the free acid, these may be used in the polycondensation reaction in the form of an ester-forming derivative, e.g., the dimethyl ester and so forth.

One or more of the following can be used in small amounts mixed with the aromatic dicarboxylic acid: aliphatic dicarboxylic acids such as adipic acid, azelaic acid, dodecanedioic acid, and sebacic acid; and alicyclic dicarboxylic acids such as 1,2-cyclohexanedicarboxylic acid, 1,3-cyclohexanedicarboxylic acid, and 1,4-cyclohexanedicarboxylic acid.

The dihydroxy compound constituting the thermoplastic polyester resin can be exemplified by aliphatic diols, e.g., ethylene glycol, propylene glycol, butanediol, hexylene glycol, neopentyl glycol, 2-methylpropane-1,3-diol, diethylene glycol, and triethylene glycol; alicyclic diols, e.g., cyclohexane-1,4-dimethanol; and mixtures of the preceding. One or more long-chain diols having a molecular weight of 400 to 6,000, i.e., polyethylene glycol, poly-1,3-propylene glycol, polytetramethylene glycol, and so forth, may be copolymerized in small amounts.

In addition, an aromatic diol, e.g., hydroquinone, resorcinol, naphthalenediol, dihydroxydiphenyl ether, and 2,2-bis (4-hydroxyphenyl)propane, may also be used.

In addition to these difunctional monomers, trifunctional monomer such as trimellitic acid, trimesic acid, pyromellitic acid, pentaerythritol, trimethylolpropane, and so forth, may also be co-used in small amounts in order to introduce crosslinking structures, while a monofunctional compound such as a fatty acid may also be co-used in small amounts to adjust the molecular weight.

A thermoplastic polyester resin provided by the polycondensation of mainly dicarboxylic acid and diol, i.e., a thermoplastic polyester resin in which at least 50 mass % and preferably at least 70 mass % of the total resin is composed of this polycondensate, is generally used as the thermoplastic polyester resin. The dicarboxylic acid is preferably an aromatic carboxylic acid, and the diol is preferably an aliphatic diol.

Among the preceding, a polyalkylene terephthalate is preferred in which at least 95 mol % of the acid component is terephthalic acid and at least 95 mass % of the alcohol component is aliphatic diol. Typical of these are polybutylene terephthalate and polyethylene terephthalate. These are preferably near to being a homopolyester, i.e., at least 95 mass % of the total resin is composed of a terephthalic acid component and a 1,4-butanediol or ethylene glycol component.

The intrinsic viscosity of the thermoplastic polyester resin is preferably 0.3 to 2 dl/g. From the standpoint of the moldability and mechanical properties, the thermoplastic polyester resin more preferably has an intrinsic viscosity in the range from 0.5 to 1.5 dl/g. The resulting resin composition readily assumes a low mechanical strength when a thermoplastic polyester resin having an intrinsic viscosity below 0.3 dl/g is used. At greater than 2 dl/g, the flowability of the resin composition is degraded, the moldability deteriorates, and the laser weldability may also be reduced.

The intrinsic viscosity of the thermoplastic polyester resin is the value measured at 30° C. in a mixed solvent of tetrachloroethane and phenol at 1:1 (mass ratio).

The amount of terminal carboxyl group in the thermoplastic polyester resin may be determined by selection as appropriate, but is generally not more than 60 eq/ton, preferably not more than 50 eq/ton, and more preferably not more than 30 eq/ton. Gas emission during melt molding of the resin composition readily occurs at above 50 eq/ton. The lower limit value on the amount of terminal carboxyl group is not particularly prescribed, but is ordinarily 10 eq/ton.

The amount of terminal carboxyl group in the thermoplastic polyester resin is the value measured by dissolving 0.5 g of the polyester resin in 25 ml of benzyl alcohol and carrying out titration using a 0.01 mol/l benzyl alcohol solution of sodium hydroxide. Any heretofore known method may be used as the method for adjusting the amount of terminal carboxyl group, for example, methods that use adjustments in the polymerization conditions, e.g., the charge ratio for the starting materials for polymerization, the polymerization temperature, the pressure reduction method, and so forth, and methods that use the reaction of a terminating agent.

Among the preceding, the thermoplastic polyester resin preferably contains polybutylene terephthalate resin and/or polyethylene terephthalate resin, and preferably at least 50 mass % of the thermoplastic polyester resin is polybutylene terephthalate resin.

The polybutylene terephthalate resin can be produced by carrying out the melt polymerization, by a batch method or continuous method, of a dicarboxylic acid component in which the main component is terephthalic acid, or an ester derivative of this dicarboxylic acid component, and a diol component in which the main component is 1,4-butanediol. In addition, after a low molecular weight polybutylene terephthalate resin has been produced by melt polymerization, the degree of polymerization (or molecular weight) can be increased to a desired value by additionally carrying out solid-phase polymerization under a nitrogen stream or under reduced pressure.

The method for producing the polybutylene terephthalate resin is preferably melt polycondensation of a dicarboxylic acid component for which the main component is terephthalic acid with a diol component for which the main component is 1,4-butanediol by a continuous method.

The catalyst used in the execution of the esterification reaction may be a heretofore known catalyst and can be exemplified by titanium compounds, tin compounds, magnesium compounds, and calcium compounds. Titanium compounds are particularly advantageous among the preceding. Specific examples of titanium compound esterification catalysts are, for example, titanium alcoholates such as tetramethyl titanate, tetraisopropyl titanate, and tetrabutyl titanate, and titanium phenolates such as tetraphenyl titanate.

The polybutylene terephthalate resin may be a polybutylene terephthalate that has been modified through copolymerization (also referred to herebelow as "modified polybutylene terephthalate resin"), and specific preferred copolymers in this regard can be exemplified by polyalkylene glycol (particularly polytetramethylene glycol)-copolymerized polyester ether resins, dimer acid-copolymerized polybutylene terephthalate resins, and isophthalic acid-copolymerized polybutylene terephthalate resins.

When a polytetramethylene glycol-copolymerized polyester ether resin is used as the modified polybutylene terephthalate resin, the proportion of the tetramethylene glycol component in the copolymer is preferably 3 to 40 mass %, more preferably 5 to 30 mass %, and even more preferably 10 to 25 mass %. The balance between the laser weldability and heat resistance tends to be excellent when such a copolymerization proportion is used, which is thus preferred.

When a dimer acid-copolymerized polybutylene terephthalate resin is used for the modified polybutylene terephthalate resin, the proportion of the dimer acid component in the total carboxylic acid component is, as the carboxylic acid group, preferably 0.5 to 30 mol %, more preferably 1 to 20 mol %, and even more preferably 3 to 15 mol %. The balance among the laser weldability, long-term heat resistance, and toughness tends to be excellent when such a copolymerization proportion is used, which is thus preferred.

When an isophthalic acid-copolymerized polybutylene terephthalate resin is used for the modified polybutylene terephthalate resin, the proportion of the isophthalic acid component in the total carboxylic acid component is, as the carboxylic acid group, preferably 1 to 30 mol %, more preferably 1 to 20 mol %, and even more preferably 3 to 15 mold. The balance among the laser weldability, heat resistance, injection moldability, and toughness tends to be excellent when such a copolymerization proportion is used, which is thus preferred.

Among the modified polybutylene terephthalate resins, polytetramethylene glycol-copolymerized polyester ether resins and isophthalic acid-copolymerized polybutylene terephthalate resins are preferred.

The content of these copolymers, in 100 mass % for the total amount of the thermoplastic polyester resin, is preferably 5 to 50 mass %, more preferably 10 to 40 mass %, and particularly preferably 15 to 30 mass %.

The intrinsic viscosity of the polybutylene terephthalate resin is preferably 0.5 to 2 dl/g. A polybutylene terephthalate resin having an intrinsic viscosity in the range from 0.6 to 1.5 dl/g is more preferred from the standpoint of the moldability and mechanical properties. The resulting resin composition readily assumes a low mechanical strength when a polybutylene terephthalate resin having an intrinsic viscosity lower than 0.5 dl/g is used. At greater than 2 dl/g, the flowability of the resin composition is deteriorated and the moldability deteriorates, and the laser weldability may also be reduced. The intrinsic viscosity is the value measured at 30° C. in a mixed solvent of tetrachloroethane and phenol at 1:1 (mass ratio).

The amount of terminal carboxyl group in the polybutylene terephthalate resin may be determined by selection as appropriate, but is generally not more than 60 eq/ton and is preferably not more than 50 eq/ton and more preferably not more than 30 eq/ton. Gas emmission during melt molding of the resin composition readily occurs at above 50 eq/ton. The lower limit value on the amount of terminal carboxyl group is not particularly prescribed, but is ordinarily 10 eq/ton based on a consideration of the productivity in the production of the polybutylene terephthalate resin.

The amount of terminal carboxyl group in the polybutylene terephthalate resin is the value measured by dissolving 0.5 g of the polyalkylene terephthalate resin in 25 ml of benzyl alcohol and carrying out titration using a 0.01 mol/l benzyl alcohol solution of sodium hydroxide. Any heretofore known method may be used as the method for adjusting the amount of terminal carboxyl group, for example, methods that use adjustments in the polymerization conditions, e.g., the charge ratio for the starting materials for polymerization, the polymerization temperature, the pressure reduction method, and so forth, and methods that use the reaction of a terminating agent.

A thermoplastic polyester resin containing both polybutylene terephthalate resin and the aforementioned modified polybutylene terephthalate resin is also preferred. Improvements in the laser transmittance and laser weldability are facilitated by incorporating modified polybutylene terephthalate resin in a particular amount, which is thus preferred.

The content of the modified polybutylene terephthalate resin in the case of incorporation of both polybutylene terephthalate resin and modified polybutylene terephthalate resin is, with respect to 100 mass % for the total of the polybutylene terephthalate resin and modified polybutylene terephthalate resin, preferably 10 to 70 mass %, more preferably 20 to 65 mass %, and even more preferably 30 to 60 mass %. When the modified polybutylene terephthalate resin content is less than 10 mass %, the laser weld strength assumes a declining trend; in excess of 70 mass % is undesirable because this can substantially reduce the moldability.

A thermoplastic polyester resin that contains both polybutylene terephthalate resin and polyethylene terephthalate resin is also preferred. Improvements in the laser transmittance and laser weldability are facilitated by incorporating polyethylene terephthalate resin in a particular amount, which is thus preferred.

The content of the polyethylene terephthalate resin in the case of incorporation of both polybutylene terephthalate resin and polyethylene terephthalate resin is, with respect to 100 mass % for the total of the polybutylene terephthalate resin and polyethylene terephthalate resin, preferably 5 to 50 mass %, more preferably 10 to 45 mass %, and even more preferably 15 to 40 mass %. When the polyethylene terephthalate resin content is less than 5 mass %, the laser weld strength assumes a declining trend; in excess of 50 mass % is undesirable because this can substantially reduce the moldability.

The polyethylene terephthalate resin is a resin in which the main constituent unit, with reference to the total constituent repeating units, is the oxyethyleneoxyterephthaloyl unit from terephthalic acid and ethylene glycol, and it may contain a constituent repeating unit other than the oxyethyleneoxyterephthaloyl unit. The polyethylene terephthalate resin is produced using mainly terephthalic acid or a lower alkyl ester thereof and ethylene glycol as the starting materials, but another acid component and/or another glycol component may be used as a starting material in conjunction therewith.

The acid component other than terephthalic acid can be exemplified by dicarboxylic acids such as phthalic acid, isophthalic acid, naphthalenedicarboxylic acid, 4,4'-diphenyl sulfone dicarboxylic acid, 4,4'-biphenyldicarboxylic acid, 1,4-cyclohexanedicarboxylic acid, and 1,3-phenylenedioxydiacetic acid and their structural isomers, malonic acid, succinic acid, and adipic acid and derivatives thereof; and oxyacids such as p-hydroxybenzoic acid and glycolic acid and derivatives thereof.

The diol component other than ethylene glycol can be exemplified by aliphatic glycols such as 1,2-propanediol, 1,3-propanediol, 1,4-butanediol, pentamethylene glycol, hexamethylene glycol, and neopentyl glycol; alicyclic glycols such as cyclohexanedimethanol; and aromatic dihydroxy compound derivatives such as bisphenol A and bisphenol S.

In addition, the polyethylene terephthalate resin may be formed by copolymerizing not more than 1.0 mol %, preferably not more than 0.5 mol %, and still more preferably not more than 0.3 mol % of a branching component, for example, an acid having a trifunctional esterification ability, e.g., tricarballylic acid, trimesic acid, and trimellitic acid; an acid having a tetrafunctional esterification ability, e.g., pyromellitic acid; or an alcohol having a trifunctional or tetrafunctional esterification ability, e.g., glycerol, trimethylolpropane, and pentaerythritol.

The intrinsic viscosity of the polyethylene terephthalate resin is preferably 0.3 to 1.5 dl/g, more preferably 0.3 to 1.2 dl/g, and particularly preferably 0.4 to 0.8 dl/g.

The intrinsic viscosity of the polyethylene terephthalate resin is the value measured at 30° C. in a mixed solvent of 1:1 (mass ratio) tetrachloroethane and phenol.

The terminal carboxyl group concentration in the polyethylene terephthalate resin is preferably 3 to 50 eq/ton, more preferably 5 to 40 eq/ton, and still more preferably 10 to 30 eq/ton. By having the terminal carboxyl group concentration be not more than 50 eq/ton, emission of a gas during melt molding of the resin composition may be inhibited and mechanical properties of the resulting laser welding member assume an improving trend, thus making this preferred. Conversely, by having the terminal carboxyl group concentration be at least 3 eq/ton, the heat resistance, resident heat stability, and hue of the laser welding member assume an improving trend, thus making this preferred.

The terminal carboxyl group concentration in the polyethylene terephthalate resin is the value determined by dissolving 0.5 g of the polyethylene terephthalate resin in 25 ml of benzyl alcohol and carrying out titration using a 0.01 mol/l benzyl alcohol solution of sodium hydroxide.

Any heretofore known method may be used as the method for adjusting the amount of terminal carboxyl group, for example, methods that use adjustments in the polymerization conditions, e.g., the charge ratio for the starting materials for polymerization, the polymerization temperature, the pressure reduction method, and so forth, and methods that use the reaction of a terminating agent.

The thermoplastic polyester resin material may contain additional resin or additives. The additional resin and additives are described below.

This thermoplastic polyester resin material has a melt volume rate (MVR, measured under a condition of 250° C. and a load of 5 kg) in the present invention of preferably at least 10 $cm^3/10$ min and more preferably at least 15 $cm^3/10$ min. When the measurement is carried out under a condition of 280° C. and a load of 2.16 kg, at least 20 $cm^3/10$ min is preferred and at least 30 $cm^3/10$ min is more preferred. The use of a thermoplastic polyester resin material having an MVR in this range makes it possible for the welding member to retain an excellent moldability even when it is, for example, a thin part of 2 mm or less or 1.5 mm or less or a very thin part of 1 mm or less.

The thermoplastic polyester resin material preferably has a crystallization temperature (Tc) of not more than 190° C. That is, the laser transparency can be further enhanced by controlling the crystallization temperature (Tc) to a lower level. The crystallization temperature (Tc) is preferably not more than 188° C., more preferably not more than 185° C., even more preferably not more than 182° C., and particularly preferably not more than 180° C. Its lower limit is generally 160° C. and is preferably at least 165° C. The crystallization temperature (Tc) is measured by DSC, the details of which are described in the examples.

The thermoplastic polyester resin material described in the preceding is molded by an injection molding method into a laser welding member having a desired shape. For example, high-speed injection molding and injection-compression molding can be used as the injection molding method.

There are no particular limitations on the injection molding conditions, but the injection speed is preferably 10 to 500 mm/sec, more preferably 30 to 400 mm/sec, even more preferably 50 to 300 mm/sec, and particularly preferably 80 to 200 mm/sec. The resin temperature is preferably 250° C. to 280° C. and more preferably 255° C. to 275° C. The mold temperature is preferably 40° C. to 130° C. and more preferably 50° C. to 100° C.

The injection ratio, which is defined as the volume of resin material injected per unit time from the output nozzle of the injection molding machine into the mold cavity, is preferably 10 to 300 $cm^3/sec$, more preferably 15 to 200 $cm^3/sec$, even more preferably 25 to 100 $cm^3/sec$, and particularly preferably 50 to 90 $cm^3/sec$. By having the injection ratio be in the indicated range, a further increase in the laser transmittance of the member at the side opposite to the gate is facilitated and an additional increase in the transmittance of the welding region in the member can be achieved by adjusting the gate position. The volume of resin material injected in a single injection is controlled in injection molding by adjusting the time required for injection and the volume of resin material injected per unit time, and the material volume of the resin material per unit time is the injection ratio (unit: $cm^3/sec$).

In addition, the injection molding is preferably carried out under a condition of 100 to 1200 $cm^3/sec·cm$ for the surface advance coefficient defined below. By having the surface advance coefficient be in the indicated range, a further increase in the laser transmittance of the gate-facing region of the member is facilitated and an additional increase in the transmittance of the welding region in the member can be achieved by adjusting the gate position.

Surface advance coefficient: the value provided by dividing the aforementioned injection ratio by the thickness of the mold cavity into which the resin material is injected The preferred range for the surface advance coefficient is 200 to 1100 $cm^3/sec·cm$, more preferably 250 to 1000 $cm^3/sec·cm$, still more preferably 300 to 950 $cm^3/sec·cm$, and particularly preferably 400 to 900 $cm^3/sec·cm$.

The laser welding member obtained by the injection molding of the above-described thermoplastic polyester resin material is subjected to laser welding. The laser welding method is not particularly limited and a common method can be used. The molded body obtained by the injection molding of the thermoplastic polyester resin material (a first member) is used as the transmissive side and is brought into contact (in particular face contact of at least the welding region) with the opposing resin molded body (a second member, the object to be joined), and the two molded bodies are welded by the irradiation of laser light and integrated to provide a single molded article. The present invention is characterized in that laser welding is performed using, as the region where welding is performed, a region located at a distance of at least 15 mm from the gate for the injection molding mold. While at least a portion of the laser welding region may be separated by at least 15 mm from the gate, preferably at least 30%, more preferably at least 50%, and even more preferably at least 70% of the overall area of the laser welding region is separated by at least 15 mm from the gate, while it is particularly preferred that the entire region to be laser welded is separated by at least 15 mm from the gate.

Investigations by the present inventor demonstrated that, when the thermoplastic polyester resin material of the present invention as described above is subjected to injection molding, the laser transparency undergoes large fluctuations as a function of the region (location) in the molded body, wherein the transmittance is poor in regions near to the gate location while an excellent transmittance is exhibited at a distance far from the gate. For example, as is also shown in the examples discussed below, the laser transmittance is shown to be low at a region at a short distance of 10 mm from the gate, while the transmittance increases as the distance becomes larger. With regard to the extent of the improvement in the transmittance, it was discovered that extremely high transmittances could be achieved, for example, a very high transmittance such as a transmittance on the level of 50% to 60%, the level of 70% or exceeding 80% was achieved with transmissive material compositions A to D in Table 2 in the examples discussed below, and particularly with transmissive material compositions A and B, though it depends on, for example, the composition of the thermoplastic polyester resin material used, the thickness of the laser welding region, and the injection molding conditions.

In addition, this transmittance is affected by, for example, the composition of the thermoplastic polyester resin material used, the thickness of the laser welding region, and the injection molding conditions. However, with the present invention, by having the light transmittance of the laser welding region for laser light with a wavelength of 940 nm be at least 30%, the laser processability is improved and a strong laser weld is made possible regardless of the composition of the thermoplastic polyester resin material, the thickness of the laser welding region, and the injection molding conditions.

There are no limitations on the shape of the laser welding member, and the overall article may have any shape as long as it has a region to be welded at a location separated from the gate of the injection molding mold by a distance of at least 15 mm, preferably at least 20 mm, more preferably at least 25 mm, even more preferably at least 30 mm, particularly preferably at least 35 mm, and most preferably at least 40 mm. In order to join and laser weld the welding region to the opposing material (a molded body of a different resin or the same resin), the welding region generally has a shape (for example, a plate shape) that has at least a contact surface (for example, a flat surface). Moreover, the thickness of the laser welding region (the region onto which the laser is emitted) can be selected from a broad range and is preferably 0.1 to 2 mm, more preferably 0.3 to 1.5 mm, and even more preferably 0.5 to 1 mm.

The size of the welding member is not limited and, for example, considering even a welding member with a three-dimensional shape as a flat shape, can be freely established in the range from 2 cm×2 cm to 50 cm×50 cm, preferably in the range from 3 cm×3 cm to 50 cm×50 cm, more preferably in the range from 3 cm×3 cm to 40 cm×40 cm, still more preferably in the range from 3 cm×3 cm to 35 cm×35 cm, and particularly preferably in the range from 3 cm×3 cm to 30 cm×30 cm.

A plural number of gates may be used or a multipoint gate system may be used. The number of resin gates in the mold at the time of molding, per the surface area of the welding member, is preferably not more than 4 pieces/1 $cm^2$, more preferably not more than 3 pieces/1 $cm^2$, and still more preferably not more than 2 pieces/1 $cm^2$.

The region to be laser welded has a light transmittance of preferably at least 35%, more preferably at least 40%, still more preferably at least 45%, even more preferably at least 50%, or at least 55%, or at least 60%, and particularly preferably at least 65% and most preferably at least 70% of laser light with a wavelength of 940 nm.

Since the transmittance increases as the thickness of the molded body declines, the region to be laser welded may be provided with a higher transmittance through suitable adjustment of, for example, the composition of the thermoplastic polyester resin material used, the thickness of the molded body, and the molding conditions, e.g., the distance from the gate of the injection molding mold and the injection speed, injection ratio, surface advance coefficient, resin temperature, and mold temperature, in order to provide a preferred transmittance as indicated above.

In the present invention, the transmittance refers to the transmittance for laser light having a wavelength of 940 nm.

The crystallization temperature (Tc) of the region that is laser welded is preferably not more than 190° C., more preferably not more than 188° C., still more preferably not more than 185° C., particularly preferably not more than 182° C., and most preferably not more than 180° C. In addition, its lower limit is generally 160° C. and is preferably at least 165° C. The method for measuring the crystallization temperature (Tc) is as described in the examples.

An integrated molded article can be made by bringing the welding region of the welding member provided by the injection molding of the aforementioned thermoplastic polyester resin material, into face contact or butt contact with an opposing member that contains a laser light absorber, irradiating laser light usually from the side of this high-transmittance welding member to at least partially melt the interface between the two, and cooling.

The laser light absorber-containing opposing member may be a member composed of a thermoplastic resin composition that can absorb laser light and that undergoes melting due to the absorption of laser light, but is not otherwise particularly limited. A specific example is usually a member composed of a resin composition containing carbon black or laser-absorbing dye in order to provide a laser light-absorbing capability. The content of the absorber, e.g., carbon black, is not particularly limited, but, for example, a content of 0.2 to 1 mass % with reference to the resin composition is preferred.

Preferred examples of the laser light-absorbing dye are nigrosine, aniline black, phthalocyanine, naphthalocyanine, porphyrin, perylene, quaterrylene, azo dyes, anthraquinone, squaric acid derivatives, and immoniums.

Nigrosine is particularly preferred among the preceding. Nigrosine is a black azine-type condensation mixture, as described in the Colour Index as C.I. Solvent Black 5 and C.I. Solvent Black 7. An example of a commercially available nigrosine product is "NUBIAN (registered trademark) BLACK" (trade name, Orient Chemical Industries Co., Ltd.).

The content of the laser light-absorbing dye, per 100 mass parts of the resin component, is 0.001 to 0.2 mass parts, preferably 0.003 to 0.1 mass parts, and more preferably 0.005 to 0.05 mass parts.

In order to obtain an even higher weld strength, preferably both of the members are the thermoplastic polyester resin material as described above and the opposing member contains carbon black or a laser light-absorbing dye. With such members, the compositions are the same except for the presence/absence of carbon black or a laser light-absorbing dye, and as a result the welded transmissive resin member and absorptive resin member are readily compatible and are more strongly bonded.

The type of irradiated laser light may be any near-infrared laser light, and, for example, a YAG (yttrium. aluminum. garnet crystal) laser (wavelength 1064 nm) or LD (laser diode) laser (wavelengths 808 nm, 840 nm, 940 nm) can preferably be used. Laser light with a wavelength of 940 nm is particularly preferred.

The molded article provided by the integration by laser welding may have any shape, size, thickness, and so forth, and particularly advantageous applications of the welded article are for electrical components for transportation machinery such as automobiles, electrical and electronic equipment components, components for industrial machinery, components for consumer products, and so forth.

As noted above, the thermoplastic polyester resin material used in the present invention may contain additional resins or additives.

This additional resin can include various types of thermoplastic resins, for example, polycarbonate resins and aromatic vinyl resins, e.g., polystyrene, butadiene rubber-containing polystyrene, acrylonitrile-styrene copolymers, and so forth. In order to achieve a high laser transparency, preferably at least one resin selected from the group consisting of polycarbonate resins and polystyrene and/or butadiene rubber-containing polystyrene is used in combination with the thermoplastic polyester resin in the present invention.

[Polycarbonate Resin]

The thermoplastic polyester resin material also preferably contains a thermoplastic polyester resin and a polycarbonate resin. Improvements in the laser weldability are facilitated by the incorporation of a specific amount of polycarbonate resin, which is thus preferred.

The polycarbonate resin is a possibly branched thermoplastic polymer or copolymer obtained by the reaction of a dihydroxy compound, or a dihydroxy compound and a small amount of a polyhydroxy compound, with phosgene or a carbonate diester. There are no particular limitations on the method for producing the polycarbonate resin, and polycarbonate resins produced by the heretofore known phosgene method (interfacial polymerization method) or melt method (transesterication method) can be used. However, polycarbonate resin produced by the melt method is preferred from the standpoint of the laser transparency and laser weldability.

An aromatic dihydroxy compound is preferred for the starting dihydroxy compound, e.g., 2,2-bis(4-hydroxyphenyl) propane (i.e., bisphenol A), tetramethylbisphenol A, bis(4-hydroxyphenyl)-p-diisopropylbenzene, hydroquinone, resorcinol, and 4,4-dihydroxydiphenyl, with bisphenol A being preferred. A compound having at least one tetralkylphosphonium sulfonate bonded to this aromatic dihydroxy compound can also be used.

Among the preceding, aromatic polycarbonate resins derived from 2,2-bis(4-hydroxyphenyl)propane and aromatic polycarbonate copolymers derived from 2,2-bis(4-hydroxyphenyl)propane and another aromatic dihydroxy compound are preferred for the polycarbonate resin. The polycarbonate resin may also be a copolymer that is mainly aromatic polycarbonate resin and is, e.g., a copolymer with a polymer or oligomer having a siloxane structure. A mixture of two or more of the aforementioned polycarbonate resins may also be used.

A monovalent aromatic hydroxy compound, e.g., m- or p-methylphenol, m- or p-propylphenol, p-tert-butylphenol, p-long chain alkyl-substituted phenol, and so forth, may be used to adjust the molecular weight of the polycarbonate resin.

The viscosity-average molecular weight of the polycarbonate resin is preferably 5,000 to 30,000, more preferably 10,000 to 28,000, and even more preferably 14,000 to 24,000. When a polycarbonate resin having a viscosity-average molecular weight lower than 5,000 is used, the resulting welding member readily assumes a low mechanical strength. At above 30,000, the flowability of the resin material becomes poor and the moldability deteriorates, and the laser weldability may also decline. The viscosity-average molecular weight of the polycarbonate resin is the viscosity-average molecular weight [Mv] derived from the solution viscosity measured at a temperature of 25° C. using methylene chloride as the solvent.

The ratio (Mw/Mn) between the mass-average molecular weight Mw and number-average molecular weight Mn of the polycarbonate resin, in terms of polystyrene as measured by gel permeation chromatography (GPC), is preferably 2 to 5 and is more preferably 2.5 to 4. When Mw/Mn is too small, the flowability in the melt state increases and the moldability assumes a declining trend. On the other hand, when Mw/Mn is too large, the melt viscosity increases and molding tends to be quite difficult.

Viewed from the standpoint of the heat stability, hydrolytic stability, hue, and so forth, the amount of terminal hydroxy group in the polycarbonate resin is preferably at least 100 mass-ppm, more preferably at least 200 mass-ppm, even more preferably at least 400 mass-ppm, and most preferably at least 500 mass-ppm. It is generally not more than 1,500 mass-ppm, preferably not more than 1,300 mass-ppm, more preferably not more than 1,200 mass-ppm, and most preferably not more than 1,000 mass-ppm. When the amount of terminal hydroxy group in the polycarbonate resin is too small, the laser transparency tends to readily decline and the initial color when molded may also deteriorate. When the amount of terminal hydroxy group is too large, the resident heat stability and the hygrothermal resistance assume declining trends.

As noted above, polycarbonate resin produced by the melt polymerization method is preferred for the polycarbonate resin from the standpoint of the laser transparency and the laser weldability.

A transesterification reaction between an aromatic dihydroxy compound and a carbonate diester is carried out in the melt polymerization method.

The aromatic dihydroxy compound is as described above.

The carbonate diester can be exemplified by dialkyl carbonate compounds such as dimethyl carbonate, diethyl carbonate, and di-tert-butyl carbonate; diaryl carbonates such as substituted diphenyl carbonates like diphenyl carbonates and ditolyl carbonate. Diaryl carbonates are preferred among the preceding and diphenyl carbonate is particularly preferred. A single carbonate diester may be used or any combination of two or more in any proportions may be used.

The ratio between the aromatic dihydroxy compound and carbonate diester may be freely selected as long as the desired polycarbonate resin is obtained. However, the carbonate diester is used preferably in an equimolar or greater amount per 1 mole of the dihydroxy compound and more preferably is used at 1.01 mole or more per 1 mole of the dihydroxy compound. The upper limit is generally 1.30 mole or less. The use of this range makes it possible to adjust the amount of terminal hydroxy group into a favorable range.

The amount of this terminal hydroxy group tends to exercise a major effect on the heat stability, hydrolytic stability, color, and so forth of polycarbonate resin. Due to this, the amount of terminal hydroxy group may be adjusted as necessary using any known method. In the case of the transesterification reaction, polycarbonate resin having an adjusted amount of terminal hydroxy group can be obtained generally by adjusting, for example, the mixing ratio between the carbonate diester and dihydroxy compound and the extent of pressure reduction during the transesterification reaction. The molecular weight of the resulting polycarbonate resin can generally also be adjusted using these steps.

This mixing ratio is as described above when the amount of terminal hydroxy group is adjusted through adjustment of the mixing ratio between the carbonate diester and aromatic dihydroxy compound.

In addition, the separate admixture of a terminating agent during the reaction is an example of a more direct method of adjustment. This terminating agent can be exemplified by monovalent phenols, monovalent carboxylic acids, and carbonate diesters. A single terminating agent may be used or any combination of two or more in any proportions may be used.

A transesterification catalyst is commonly used in polycarbonate resin production by the melt polymerization method. Any transesterification catalyst can be used. The use of an alkali metal compound and/or an alkaline-earth metal compound is preferred here. In addition, a basic compound, for example, a basic boron compound, basic phosphorus compound, basic ammonium compound, amine compound, and so forth, may be used in combination on an auxiliary basis. A single transesterification catalyst may be used or any combination of two or more in any proportions may be used.

The reaction temperature in the melt polymerization method is generally 100° C. to 320° C. The pressure during the reaction is generally a vacuum condition of 2 mmHg or below (267 Pa or below). With regard to the specific process, a melt polycondensation reaction may be carried out under conditions in the indicated ranges while removing by-products such as the hydroxy compound.

The melt polycondensation reaction can be carried out by a batch method or a continuous method. In the case of a batch method, the reaction substrates, reaction medium, catalyst, additives, and so forth may be mixed in any sequence as long as the desired polycarbonate resin is obtained, and a favorable sequence may be freely established. However, the melt polycondensation reaction is preferably carried out using a continuous method based on considerations of, for example, the stability of the polycarbonate resin and the resin materials containing the polycarbonate resin.

A catalyst deactivator may be used in the melt polymerization method on an optional basis. Any compound that neutralizes the transesterification catalyst can be used as the catalyst deactivator. Examples here are sulfur-containing acidic compounds and their derivatives. A single catalyst deactivator may be used or any combination of two or more in any proportions may be used.

The amount of use of the catalyst deactivator with respect to the alkali metal or alkaline-earth metal present in the transesterification catalyst is generally at least 0.5 equivalents and preferably at least 1 equivalent and is generally not more than 10 equivalents and preferably not more than 5 equivalents. In addition, considered with reference to the polycarbonate resin, it is generally at least 1 mass-ppm and is generally not more than 100 mass-ppm and is preferably not more than 20 mass-ppm.

With regard to the content when the thermoplastic polyester resin material contains both a thermoplastic polyester resin and a polycarbonate resin, the polycarbonate resin is preferably 10 to 50 mass %, more preferably 15 to 45 mass %, and even more preferably 20 to 40 mass % with reference to 100 mass % for the total of the thermoplastic polyester resin and polycarbonate resin. The laser weld strength assumes a declining trend when the polycarbonate resin content is less than 10 mass %, while the moldability may undergo a substantial decline at above 50 mass %, thus making these undesirable.

[Aromatic Vinyl Resin]

A thermoplastic polyester resin material containing both a thermoplastic polyester resin and an aromatic vinyl resin is also preferred.

Aromatic vinyl resin is a polymer in which the main component is an aromatic vinyl compound. The aromatic vinyl compound can be exemplified by styrene, α-methylstyrene, para-methylstyrene, vinyltoluene, and vinylxylene, wherein styrene is preferred. A typical example of an aromatic vinyl resin is polystyrene (PS).

A copolymer provided by the copolymerization of another monomer with an aromatic vinyl compound may also be used as the aromatic vinyl resin. A typical example here is acrylonitrile-styrene copolymer, in which styrene is copolymerized with acrylonitrile.

A rubber-containing aromatic vinyl resin provided by the copolymerization or blending of a rubber component is also preferably used as the aromatic vinyl resin. The rubber component can be exemplified by conjugated diene hydrocarbons such as butadiene, isoprene, and 1,3-pentadiene, but the use of butadienic rubber is preferred for the present invention. While an acrylic rubber component can also be used as the rubber component, this is not preferred because it causes a poor toughness.

When a rubber component is copolymerized or blended, the amount of the rubber component is generally at least 1 mass % and less than 50 mass % in the total segments in the aromatic vinyl resin. The amount of the rubber component is preferably 3 to 40 mass %, more preferably 5 to 30 mass %, and even more preferably 5 to 20 mass %.

Rubber-containing polystyrene is preferred for the rubber-containing aromatic vinyl resin, while butadiene rubber-containing polystyrene is more preferred and in particular high-impact polystyrene (HIPS) is even more preferred from a toughness standpoint.

The aromatic vinyl resin preferably has a mass-average molecular weight of 50,000 to 500,000. The mass-average molecular weight of 100,000 to 400,000 is more preferred, and 150,000 to 300,000 is particularly preferred. When the molecular weight is lower than 50,000, bleed-out may be found in the molded article, and/or decomposition gas is emitted during molding and it is difficult to obtain a satisfactory weld strength. When the molecular weight is larger than 500,000, it is difficult to achieve an adequate flowability and an improved laser weld strength.

The aromatic vinyl resin has a melt flow rate (MFR), measured at 200° C. and 98 N, preferably of 0.1 to 50 g/10 min, more preferably 0.5 to 30 g/10 min, and still more preferably 1 to 20 g/10 min. When the MFR is lower than 0.1 g/10 min, the compatibility with the thermoplastic polyester resin then becomes inadequate and the appearance defect of delamination may occur upon injection molding. The impact resistance undergoes a large decline when the MFR is larger than 50 g/10 min, which is thus undesirable.

Especially in the case of polystyrene, the MFR is preferably 1 to 50 g/10 min, more preferably 3 to 35 g/10 min, and still more preferably 5 to 20 g/10 min. For the case of a butadiene rubber-containing polystyrene, the MFR is preferably 0.1 to 40 g/10 min, more preferably 0.5 to 30 g/10 min, and still more preferably 1 to 20 g/10 min.

When the thermoplastic polyester resin material contains both thermoplastic polyester resin and aromatic vinyl resin, the content of the aromatic vinyl resin with respect to 100 mass % for the total of the thermoplastic polyester resin and aromatic vinyl resin is preferably 10 to 50 mass %, more preferably 15 to 45 mass %, and even more preferably 20 to 40 mass %. When the aromatic vinyl resin content is less than 10 mass %, the laser weld strength assumes a declining trend; the heat resistance and thermal discoloration resistance may decline at more than 50 mass %, which is thus undesirable.

It is particularly preferred in the present invention from the standpoint of the laser weldability that the thermoplastic polyester resin material contains a thermoplastic polyester resin, polystyrene and/or butadiene rubber-containing polystyrene, and polycarbonate resin.

The polycarbonate resin is as described above.

The polystyrene may be a homopolymer of styrene or may have another aromatic vinyl monomer, for example, α-methylstyrene, para-methylstyrene, vinyltoluene, vinylxylene, and so forth, copolymerized therein, for example, in a range of not more than 50 mass %.

The butadiene rubber-containing polystyrene has a butadienic rubber component copolymerized or blended therein, wherein the amount of the butadienic rubber component is generally at least 1 mass % and less than 50 mass %, preferably 3 to 40 mass %, more preferably 5 to 30 mass %, and still more preferably 5 to 20 mass %. High-impact polystyrene (HIPS) is particularly preferred for the butadiene rubber-containing polystyrene.

In comparison between polystyrene and butadiene rubber-containing polystyrene, butadiene rubber-containing polystyrene is preferred, and particularly high-impact polystyrene (HIPS) is preferred.

The preferred mass-average molecular weight and MFR of the polystyrene and butadiene rubber-containing polystyrene are as described above.

When the thermoplastic polyester resin material contains a thermoplastic polyester resin, polystyrene and/or butadiene rubber-containing polystyrene, and a polycarbonate resin, the crystallization temperature (Tc) of this thermoplastic polyester resin material is preferably not more than 190° C. That is, an additional increase in the laser transparency can be brought about by inducing a suitable decline in the crystallization temperature by a suitable inhibition of the transesterification reaction between the thermoplastic polyester resin and the polycarbonate resin. The crystallization temperature (Tc) is more preferably not more than 188° C., even more preferably not more than 185° C., particularly preferably not more than 182° C., and most preferably not more than 180° C. Its lower limit is generally 160° C. and is preferably at least 165° C.

The method for measuring the crystallization temperature (Tc) is as described above.

The contents are as follows when the thermoplastic polyester resin material contains a thermoplastic polyester resin, polystyrene and/or butadiene rubber-containing polystyrene, and a polycarbonate resin.

The content of the thermoplastic polyester resin, based on 100 mass % for the total of the thermoplastic polyester resin, polystyrene and/or butadiene rubber-containing polystyrene, and polycarbonate resin, is preferably 30 to 90 mass %, more preferably 40 to 80 mass %, and still more preferably 50 to 70 mass %. The heat resistance may decline when the content is less than 30 mass %, while the transmittance readily declines at above 90 mass %, thus making these undesirable.

The content of the polystyrene and/or butadiene rubber-containing polystyrene, based on 100 mass % for the total of the thermoplastic polyester resin, polystyrene and/or butadiene rubber-containing polystyrene, and polycarbonate resin, is preferably 1 to 50 mass %, more preferably 3 to 45 mass %, and still more preferably 5 to 40 mass %. The laser weldability and toughness may become poor at a content of less than 1 mass %, while the heat resistance readily undergoes a large decline at above 50 mass %, thus making these undesirable.

The content of the polycarbonate resin, based on 100 mass % for the total of the thermoplastic polyester resin, polystyrene and/or butadiene rubber-containing polystyrene, and polycarbonate resin, is preferably 1 to 50 mass %, more preferably 3 to 45 mass %, and still more preferably 5 to 40 mass %. When the content is less than 1 mass %, the laser weldability declines, the dispersion of the polystyrene and/or butadiene rubber-containing polystyrene becomes poor, and the surface appearance of the molded article readily declines. Transesterification with the thermoplastic polyester resin proceeds and the resident heat stability may decline at above 50 mass %, thus making this undesirable.

The total content of the polystyrene and/or butadiene rubber-containing polystyrene and the polycarbonate resin, in 100 mass % for the total of the thermoplastic polyester resin, polystyrene and/or butadiene rubber-containing polystyrene, and polycarbonate resin, is preferably 10 to 55 mass %, more preferably 20 to 50 mass %, and still more preferably 25 to 45 mass %. The balance between the heat resistance and laser transmittance tends to be excellent when such a content is used, which is thus preferred.

The proportion between the polystyrene and/or butadiene rubber-containing polystyrene and the polycarbonate resin component is, as the mass ratio, preferably 5:1 to 1:5 and more preferably 4:1 to 1:4. The balance between the heat resistance and laser transmittance tends to be excellent when such a proportion is used, which is thus preferred.

[Other Incorporated Components]

The thermoplastic polyester resin material used in the present invention may contain various additives in a range in which the effects of the present invention are not impaired. These additives can be exemplified by stabilizers, mold releasing agents, reinforcing fillers, flame retardants, flame retardant synergists, anti-dripping agents, ultraviolet absorbers, static inhibitors, antifogging agents, lubricants, anti-blocking agents, plasticizers, dispersing agents, and antiseptics.

The thermoplastic polyester resin material used in the present invention preferably also contains a flame retardant. There are various flame retardants, e.g., halogen flame retardants, phosphorus flame retardants (e.g., melamine polyphosphate), nitrogenous flame retardants (e.g., melamine cyanurate), and metal hydroxides (e.g., magnesium hydroxide). However, in the present invention bromine flame retardants are preferred for the halogen flame retardants, and brominated polycarbonates, brominated epoxy compounds, brominated poly(meth)acrylates, and so forth are more preferred, and the incorporation of brominated polycarbonate flame retardants is particularly preferred. In general, a decline in the transmittance ordinarily occurs when a halogen flame retardant is incorporated. However, through the incorporation of the combination of a brominated polycarbonate flame retardant and the nickel-containing colorant described below, an excellent flame retardancy and the laser light transparency can be obtained, and in addition, the resulting molded body has a low warpage and a strong laser weld is made possible in a short welding time.

This effect is similarly thought to be brought about since the brominated polycarbonate flame retardant phase in the surface layer portion of the resulting molded body is dispersed while not being stretched as much as the other flame retardants are. It is believed that the transmittance is high because the ratio between the long diameter and the short diameter of the brominated polycarbonate flame retardant phase in the surface layer portion is small and the internal scattering of the laser light is then small.

A brominated polycarbonate flame retardant heretofore known as a brominated polycarbonate flame retardant can be used as the brominated polycarbonate flame retardant, and a preferred specific example is brominated polycarbonate obtained from brominated bisphenol A and particularly tetrabromobisphenol A. Its terminal structure can be exemplified by the phenyl group, 4-t-butylphenyl group, and 2,4,6-tribromophenyl group, and a brominated polycarbonate having the 2,4,6-tribromophenyl group for its terminal group structure is particularly preferred.

The average number of carbonate repeating units in the brominated polycarbonate flame retardant is determined by selection as appropriate, but is generally 2 to 30. When the average number of carbonate repeating units is low, this can cause a reduction in the molecular weight of the thermoplastic polyester resin when melted. Conversely, when too high, this can cause poor dispersion within the molded body and the appearance of the molded body and particularly the gloss may be reduced. Thus, the average number of this repeating unit is preferably 3 to 15 and is particularly preferably 3 to 10.

The molecular weight of the brominated polycarbonate flame retardant may be freely selected and is determined by selection as appropriate. However, as the viscosity-average molecular weight, it is preferably 1,000 to 20,000, more preferably 1,500 to 15,000, and even more preferably 1,500 to 10,000.

The viscosity-average molecular weight of the brominated polycarbonate flame retardant refers to the value calculated using Schnell's viscosity equation, see below, wherein the intrinsic viscosity ($[\eta]$) is determined by measuring the viscosity of a methylene chloride solution of the brominated polycarbonate resin at 20° C. using a Ubbelohde viscometer.

$[\eta]=1.23\times10^{-4}Mv^{0.83}$

The brominated polycarbonate flame retardant obtained from brominated bisphenol A can be obtained by a common method in which, for example, the brominated bisphenol is reacted with phosgene. The terminating agent can be exemplified by aromatic monohydroxy compounds, which may be substituted by halogen or an organic group.

The content of the brominated polycarbonate flame retardant, per 100 mass parts of the thermoplastic polyester resin, is preferably 20 to 70 mass parts, more preferably at least 25 mass parts, even more preferably at least 30 mass parts, still more preferably at least 35 mass parts, and particularly preferably at least 40 mass parts, and is more preferably not more than 65 mass parts, even more preferably not more than 60 mass parts, and particularly preferably not more than 55 mass parts. When the content of the brominated polycarbonate flame retardant is too low, the flame retardancy of the thermoplastic polyester resin material becomes inadequate and the laser light transparency and laser weldability deteriorate. Conversely, when it is too large, the mechanical properties and mold releasability decline and the problem of bleed-out of the flame retardant is produced.

In this Description, the brominated polycarbonate flame retardant is differentiated from the polycarbonate resin described in the preceding and is not encompassed by the polycarbonate resin.

The thermoplastic polyester resin material used in the present invention preferably contains a nickel-containing colorant as a colorant. The incorporation of a nickel-containing colorant in combination with a brominated polycarbonate flame retardant provides an excellent laser light transparency, makes possible a strong laser weld in a short weld time, and also provides an excellent warping resistance. It has been also discovered that the flame retardancy is improved when a nickel-containing colorant is incorporated.

A nickel-containing dye is one of the various dyes (including pigments), and it uses the nickel-containing colorant. This is preferably a metal complex dye or a metal-containing dye wherein a dye that forms a complex with nickel is preferred. The functional group in the complex dye that forms the complex with nickel can be exemplified by the hydroxyl group, carboxyl group, and amino group, wherein preferred examples are azo compounds and azomethine compounds that have these functional groups on the benzene rings surrounding the azo group or azomethine group, for example, at each ortho position on the benzene rings. Taking a monoazo dye as an example, there are the 1:1 metal complex dyes, in which 1 Ni atom is coordination bonded to 1 monoazo dye molecule, and the 1:2 metal complex dyes, in which 1 Ni atom is coordinated to 2 molecules of the monoazo dye.

A particularly preferred example of a nickel-containing colorant is C.I. Solvent Brown 53, which is an Ni complex azo dye. Its chemical name is [2,3'-bis[[(2-hydroxyphenyl)methylene]amino]but-2-enedinitrilato(2-)-N2,N3,O2,O3] nickel and its chemical structural formula is as follows.

[Chemical 1]

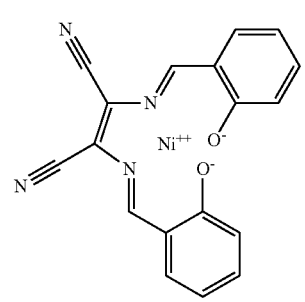

C.I. Solvent Brown 53 is also commercially available as a masterbatch, and the use is also preferred of eBIND LTW-8950H (trade name, from Orient Chemical Industries Co., Ltd.), which is a masterbatch with polybutylene terephthalate resin.

The nickel content in the nickel-containing colorant is preferably 1 to 40 mass %, preferably at least 5 mass %, more preferably at least 10 mass %; preferably not more than 30 mass %, and more preferably not more than 20 mass %. At below the indicated lower limit, the improving effect on the flame retardancy may be inadequate and thermal discoloration resistance tends to occur readily. In addition, at above the indicated upper limit value, the black tint may be deficient when toning to a black color.

The content of the nickel-containing colorant, per 100 mass parts of the thermoplastic polyester resin, is preferably 0.01 to 5 mass parts and is more preferably at least 0.03 mass parts, even more preferably at least 0.06 mass parts, and particularly preferably at least 0.1 mass parts and is more preferably not more than 3 mass parts, even more preferably not more than 2 mass parts, and particularly preferably not more than 1 mass part. At below the indicated lower limit, the effect of improving the flame retardancy may be inadequate and thermal discoloration resistance tends to occur readily. At above the indicated upper limit value, the black tint may be deficient when toning to a black color.

The nickel content in the thermoplastic polyester resin material preferably is 0.001 to 1 mass % and is more preferably at least 0.003 mass %, even more preferably at least 0.006 mass %, and particularly preferably at least 0.01 mass % and is more preferably not more than 0.8 mass %, even more preferably not more than 0.5 mass %, particularly preferably not more than 0.3 mass %, and most preferably not more than 0.1 mass %. At below the indicated lower limit, the improving effect on the flame retardancy may be inadequate; at above the indicated upper limit value, the black tint may be deficient when toning to a black color.

The thermoplastic polyester resin material used in the present invention may also contain an antimony compound in order to bring about additional improvements in the flame retardancy. However, because the incorporation of an antimony compound is associated with a reduction in the laser light transparency, the antimony compound content, when such is incorporated, preferably does not exceed 1 mass % in the resin composition.

Antimony trioxide ($Sb_2O_3$), antimony pentoxide ($Sb_2O_5$), and sodium antimonate are preferred examples of the antimony compound. Among these, antimony trioxide is preferred from the standpoint of the impact resistance.

When an antimony compound is incorporated, the mass concentration of the bromine atoms from the brominated polycarbonate flame retardant and the antimony atoms from the antimony compound in the resin composition is, for the total of the two, preferably 3 to 25 mass %, more preferably 4 to 22 mass %, and even more preferably 7 to 20 mass %. The flame retardancy assumes a declining trend at less than 3 mass %, while the mechanical strength assumes a declining trend in excess of 20 mass %. In addition, the mass ratio between the bromine atom and antimony atom (Br/Sb) is preferably 1 to 15, more preferably 3 to 13, and even more preferably 7 to 11. The use of this range is preferred because the reduction in the laser transmittance is then small and a trend is set up of facilitating the achievement of the laser weldability with the flame retardancy.

When an antimony compound is incorporated, it is preferably blended in the form of a masterbatch with a thermoplastic polyester resin. Doing this facilitates the presence of the antimony compound in the thermoplastic polyester resin phase and tends to suppress reductions in the impact resistance.

The content of the antimony compound in the masterbatch preferably is 20 to 90 mass %. When the antimony compound is less than 20 mass %, the proportion of the antimony compound in the flame retardant masterbatch is then low and there is little additional improvement in the flame retardancy provided to the thermoplastic polyester resin to be blended therewith. On the other hand, it is undesirable for the antimony compound to exceed 90 mass % for the following reasons. That is, the dispersibility of the antimony compound readily declines, the flame retardancy of the resin composition becomes unstable when this is blended into the thermoplastic polyester resin, and the processability during masterbatch production also undergoes a substantial decline. For example, when production is carried out using an extruder, problems readily occur, e.g., the strand is unstable and may break easily.

The content of the antimony compound in the masterbatch is preferably 30 to 85 mass %, more preferably 40 to 80 mass %, and even more preferably 50 to 80 mass %.

The content when an antimony compound is incorporated, per 100 mass parts of the thermoplastic polyester resin and as noted above, is preferably not more than 1 mass part and is more preferably at least 0.05 mass parts and even more preferably at least 0.1 mass parts and is more preferably not more than 0.8 mass parts, even more preferably not more than 0.6 mass parts, and particularly preferably not more than 0.4 mass parts. By using such a content, reductions in the laser transmittance are suppressed and a trend is set up of an excellent balance between the laser weldability and flame retardancy.

[Stabilizer]

The thermoplastic polyester resin material preferably contains a stabilizer.

The stabilizer can be exemplified by various stabilizers such as phosphorus stabilizers, sulfur stabilizers, and phenolic stabilizers. Phosphorus stabilizers and phenolic stabilizers are particularly preferred.

The phosphorus stabilizers can be exemplified by phosphorous acid, phosphoric acid, phosphite esters, and phosphate esters, whereamong organophosphate compounds, organophosphite compounds, and organophosphonite compounds are preferred and organophosphate compounds are particularly preferred.

The organophosphate compound is preferably a compound given by the following general formula.

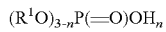

$$(R^1O)_{3-n}P(=O)OH_n$$

(In the formula, $R^1$ is an alkyl group or aryl group, and each may be the same as the others or may differ from the others. n represents an integer from 0 to 2.)

The $R^1$ in the aforementioned general formula is more preferably an alkyl group having a carbon number of at least 1 and preferably at least 2 and generally not more than 30 and preferably not more than 25, or an aryl group having a carbon number of at least 6 and generally not more than 30. However, an alkyl group is more preferred than an aryl group for $R^1$. When two or more $R^1$'s are present, the $R^1$'s may each be the same as the other or may differ from each other.

Long-chain ($R^1=C_{8-30}$) alkyl acid phosphate compounds are more preferred. Specific examples of the $C_{8-30}$ alkyl groups are the octyl group, 2-ethylhexyl group, isooctyl group, nonyl group, isononyl group, decyl group, isodecyl group, dodecyl group, tridecyl group, isotridecyl group, tetradecyl group, hexadecyl group, octadecyl group, eicosyl group, and triacontyl group.

The long-chain alkyl acid phosphates can be exemplified by octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxypolyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dilauryl acid phosphate, distearyl acid phosphate, diphenyl acid phosphate, and bisnonylphenyl acid phosphate. Among these, octadecyl acid phosphate is preferred and commercially available under the product name "Adeka Stab AX-71" from the ADEKA Corporation.

In the particular case of the incorporation of both thermoplastic polyester resin and polycarbonate resin, the blending of a phosphorus stabilizer as given by the aforementioned general formula provides a suitable inhibition of the transesterification reaction between these two and tends to facilitate bringing the crystallization temperature of the thermoplastic polyester resin material to equal to or less than 190° C., and as a consequence also facilitates further improvements in the laser transparency and laser weldability.

The content of the phosphorus stabilizer, per 100 mass parts of the total of the thermoplastic polyester resin and the additional resin incorporated as necessary, is preferably 0.001 to 1 mass parts. When the phosphorus stabilizer content is less than 0.001 mass parts, there is then little likelihood of improvements in the compatibility and heat stability of the welding member and a decline in the molecular weight and a deterioration in the color readily occur during molding. At above 1 mass part, the amount becomes excessive and a tendency is set up whereby silver streak and a deterioration in color are more likely to occur. The phosphorus stabilizer content is more preferably 0.01 to 0.6 mass parts and is even more preferably 0.05 to 0.4 mass parts.

The phenolic stabilizer is preferably a hindered phenolic stabilizer, for example, pentaerythritol tetrakis[3-(3,5-di-tert-butyl-4-hydroxyphenyl)propionate], octadecyl 3-(3,5-di-tert-butyl-4-hydroxyphenyl)propionate, thiodiethylenebis [3-(3,5-di-tert-butyl-4-hydrophenyl)propionate], N,N'-hexan-1,6-diylbis[3-(3,5-di-tert-butyl-4-hydroxyphenyl) propionamide)], 2,4-dimethyl-6-(1-methylpentadecyl) phenol, diethyl[[3,5-bis(1,1-dimethylethyl)-4-hydroxyphenyl]methyl] phosphoate, 3,3',3'',5,5',5''-hexa-tert-butyl-α,α',α''-(mesitylen-2,4,6-triyl)tri-p-cresol, 4,6-bis (octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl-propionate], 1,3,5-tris(3,5-di-tert-butyl-4-hydroxybenzyl)-1, 3,5-triazine-2,4,6(1H,3H,5H)-trione, 2,6-di-tert-butyl-4-(4, 6-bis(octylthio)-1,3,5-triazin-2-ylamino)phenol, and 2-[1-(2-hydroxy-3,5-di-tert-pentylphenyl)ethyl]-4,6-di-tert-pentylphenyl acrylate.

Pentaerythritol tetrakis[3-(3,5-di-tert-butyl-4-hydroxyphenyl)propionate] and octadecyl 3-(3,5-di-tert-butyl-4-hydroxyphenyl)propionate are preferred among the preceding. These phenolic oxidation inhibitors can be specifically exemplified by "Irganox 1010" and "Irganox 1076" from BASF SE and "Adeka Stab AO-50" and "Adeka Stab AO-60" from the ADEKA Corporation.

A single phenolic stabilizer may be incorporated or any combination of two or more in any proportions may be incorporated.

The content of the phenolic stabilizer, per 100 mass parts of the total of the thermoplastic polyester resin and the additional resin incorporated as necessary, is preferably 0.01 to 1 mass parts. A trend of a declining heat stability is assumed when the content is less than 0.01 mass parts, while the laser transmittance may decline at above 1 mass part. A more preferred content is 0.05 to 0.8 mass parts, and an even more preferred content is 0.1 to 0.6 mass parts.

The combined use of a phenolic stabilizer and a phosphorus stabilizer as given by the aforementioned general formula is preferred in the present invention from the standpoint of the residence properties and the heat resistance, laser transmittance, and laser weldability.

[Mold Releasing Agent]

The thermoplastic polyester resin material also preferably contains a mold releasing agent. Heretofore known mold releasing agents that are commonly used in polyester resins can be used for this mold releasing agent, whereamong one or more mold releasing agents selected from polyolefin compounds, fatty acid ester compounds, and silicone compounds are preferred.

The polyolefin compounds can be exemplified by paraffin wax and polyethylene wax. It is preferable when a mass-average molecular weight is 700 to 10,000, and more preferably 900 to 8,000. Modified polyolefin compounds provided by the introduction of, e.g., the hydroxyl group, carboxyl group, acid anhydride group, epoxy group, and so forth, in side chain position are also particularly preferred.

The fatty acid ester compounds can be exemplified by fatty acid esters such as glycerol/fatty acid esters, sorbitan/fatty acid esters, and pentaerythritol/fatty acid esters and by their partial saponification products. Mono- and difatty acid esters constituted of fatty acid having 11 to 28 and preferably 17 to 21 carbon atoms are preferred. Specific examples are glycerol monostearate, glycerol monobehenate, glycerol dibehenate, glycerol-12-hydroxymonostearate, sorbitan monobehenate, pentaerythritol distearate, and pentaerythritol tetrastearate.

Modified compounds are preferred for the silicone compounds considering, for example, the compatibility with the thermoplastic polyester resin. Modified silicone oils can be exemplified by silicone oils provided by the introduction of an organic group in side chain position on a polysiloxane and silicone oils provided by the introduction of an organic group at both terminals and/or one terminal of a polysiloxane. The introduced organic group can be exemplified by the epoxy group, amino group, carboxyl group, carbinol group, methacryl group, mercapto group, and phenol group, and the epoxy group is preferred. A particularly preferred modified silicone oil is silicone oil provided by the introduction of the epoxy group in side chain position on a polysiloxane.

The content of the mold releasing agent is preferably 0.05 to 2 mass parts per 100 mass parts of the total of the thermoplastic polyester resin and the additional resin that is incorporated as necessary. At less than 0.05 mass parts, the surface properties assume a declining trend due to poor mold release during melt molding. At more than 2 mass parts, on the other hand, the processability in kneading the resin material declines and haze may be observed at the surface of the molded article. The content of the mold releasing agent is preferably 0.1 to 1.5 mass parts and is more preferably 0.3 to 1.0 mass parts.

[Reinforcing Filler]

The thermoplastic polyester resin material may also contain a reinforcing filler.

The inorganic fillers commonly used in plastics can be used as this reinforcing filler. A fibrous filler, e.g., glass fiber, carbon fiber, basalt fiber, wollastonite, potassium titanate fiber, and so forth, can preferably be used. Also usable are particulate or irregularly shaped fillers such as calcium carbonate, titanium oxide, feldspar minerals, clays, organic clays, and glass beads; plate-shaped fillers such as talc; and scale-shaped fillers such as glass flake, mica, and graphite.

Among the preceding, the use of glass fibers is preferred based on considerations of the laser light transparency, mechanical strength, rigidity, and heat resistance.

A reinforcing filler that has been subjected to a surface treatment with a surface treatment agent such as a coupling agent is more preferably used as the reinforcing filler. A glass fiber having a surface treatment agent bonded thereto is preferred for the excellent durability, hygrothermal resistance, hydrolysis resistance, and heat-shock resistance thereby provided.

Any heretofore known surface treatment agent can be used as the surface treatment agent here, and preferred specific examples are silane coupling agents, e.g., aminosilanes, epoxysilanes, allylsilanes, and vinylsilanes.

An aminosilane surface treatment agent is preferred among the preceding, and preferred specific examples thereof are γ-aminopropyltriethoxysilane, γ-aminopropyltrimethoxysilane, and γ-(2-aminoethyl)aminopropyltrimethoxysilane.

Additional preferred examples of the surface treatment agent are epoxy resins such as novolac-type epoxy resins and bisphenol A-type epoxy resins. Bisphenol A-type epoxy resins are preferred therebetween.

A single silane surface treatment agent or a plurality thereof may be used; a single epoxy resin or a plurality thereof may be used; or a silane surface treatment agent may be used in combination with an epoxy resin.

Viewed from the standpoint of the laser weldability, the glass fiber is also preferably a glass fiber that has an anisotropic cross-sectional shape wherein the ratio between the long diameter and the short diameter for the cross section is 1.5 to 10.

With regard to the cross-sectional shape, the cross section preferably has an oval, elliptical, or cocoon shape with an oval-shaped cross section being particularly preferred. The long diameter/short diameter ratio is preferably in the range from 2.5 to 8 and more preferably in the range from 3 to 6. Moreover, when D2 is the long diameter of the cross section of the glass fiber in the molded article, D1 is its short diameter and L is the average fiber length, the aspect ratio ((L×2)/(D2+D1)) is preferably at least 10. When a glass fiber having such a flat shape is used, warping of the molded article is suppressed, and this is effective in particular when a box-shaped welded article is produced.

The content of the reinforcing filler is 0 to 100 mass parts per 100 mass parts for the total of the thermoplastic polyester resin and the additional resin that is incorporated as necessary. The flowability and laser weldability decline when the content of the reinforcing filler exceeds 100 mass parts, which is thus undesirable. The content of the reinforcing filler is more preferably 5 to 90 mass parts, even more preferably 15 to 80 mass parts, still more preferably 20 to 70 mass parts, and particularly preferably 30 to 60 mass parts.

[Production of the Thermoplastic Polyester Resin Material]

The production of the thermoplastic polyester resin material of the present invention can be carried out according to common methods for the preparation of resin compositions. In general, the respective components and the various additives that are added as desired are combined and thoroughly mixed and are then subjected to melt-kneading in a single-screw or twin-screw extruder. The resin material of the present invention may also be prepared by feeding the respective components by use of a feeder to an extruder without pre-mixing or with pre-mixing only partly the components, and melt-kneading.

In addition, a masterbatch may be prepared by melt-kneading a blend of a portion of the additional components in the thermoplastic polyester resin and a portion of the additional resin that is incorporated on an optional basis, followed by blending the remaining additional components into this and melt-kneading.

When a fibrous reinforcing filler such as glass fiber is used, this is also preferably fed from a side feeder along the extruder cylinder.

The heating temperature during melt-kneading can generally be selected as appropriate from the range of 220° C. to 300° C. When the temperature is too high, decomposition gases are readily emitted and this can cause opacification. It is therefore desirable to select the screw structure based on a consideration of, for example, the shear heating.

With regard to the laser welding molded body provided by the molding of the thermoplastic polyester resin material used in the present invention, preferably the thermoplastic polyester resin forms a continuous matrix phase on the surface layer of the molded body with a brominated polycarbonate flame retardant phase present dispersed in the continuous phase of the thermoplastic polyester resin, and the ratio between the long diameter and the short diameter (long diameter/short diameter) for the brominated polycarbonate flame retardant phase is preferably in the range from 1 to 5. Since the brominated polycarbonate flame retardant phase undergoes dispersion to a lesser extent than other flame retardants, it is thought that having a small ratio between the long diameter and short diameter results in little internal scattering of the laser light and thereby provides an excellent laser light transparency. The long diameter/short diameter ratio is more preferably 1.2 to 4 and is even more preferably 1.4 to 3.

With regard to observation of the morphology of this molded body, measurements can be carried out by observation of the cross section of the molded body using, for example, an optical microscope, a scanning electron microscope (SEM), or a transmission electron microscope (TEM). Observation with a scanning electron microscope (SEM) is preferred.

Specifically, using an SEM/EDS analyzer, the surface of the molded body (depth: less than 20 µm) is observed as a backscattered electron image at a magnification of 1,500× to 100,000× at an acceleration voltage of 1.5 to 2 kV.

Figure 3:
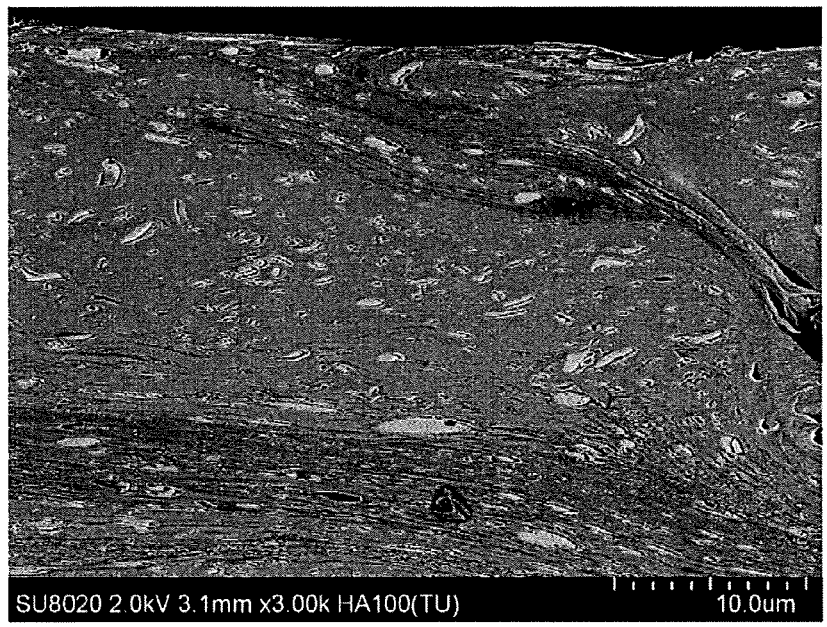
FIG. 3 is a photograph of a backscattered electron image provided by SEM/EDS analysis of the surface layer portion of the molded body obtained in Example 20.

FIG. 3 gives an example of the morphology of the molded body of the present invention and is a photograph (magnification 3,000×) of the backscattered electron image provided by SEM/EDS analysis of the surface layer of the molded body obtained in Example 20 discussed below. In FIG. 3, a polybutylene terephthalate resin phase constitutes the blackish gray continuous phase (matrix phase), including a dispersed phase of a brominated polycarbonate flame retardant that is flat and a somewhat pale white, and it is thus confirmed that the brominated polycarbonate flame retardant is dispersed in a continuous phase of the polybutylene terephthalate resin.

The long diameter and the short diameter of the brominated polycarbonate flame retardant phase can be acquired by subjecting the image provided by backscattered electron imaging to contrast intensification or brightness adjustment or adjustment of both. The diameter lengths of at least fifty of the brominated polycarbonate flame retardant phase are measured, and a long diameter/short diameter is calculated from the average values thereby provided. The long diameter refers to the maximal length for the flame retardant phase, while the short diameter refers to the minimal diameter among the lengths that perpendicularly intersect this long diameter. The ratio between the long diameter and the short diameter (long diameter/short diameter) of the brominated polycarbonate flame retardant phase in Reference Example 1 was 2.7.

By having the special morphological structure as described above, an excellent laser light transparency is provided, and a molded body that presents an even better balance among the laser weldability, flame retardancy, and warping resistance is obtained.

The thermoplastic polyester resin material used in the present invention is preferably produced by melt-kneading using a melt-kneader such as an extruder, and kneading by a special method is recommended because it is quite difficult to consistently form the morphological structure described above by just mixing the respective starting components and simply kneading.

The method described in the following is a preferred production method for consistently forming the morphological structure for the case in which polybutylene terephthalate resin is incorporated as the main component for the thermoplastic polyester resin.

The polybutylene terephthalate resin, brominated polycarbonate flame retardant, nickel-containing colorant, and other components incorporated on an optional basis are mixed in specified proportions followed by feed to a single-screw or twin-screw extruder equipped with a die nozzle. Melt-kneading is subsequently carried out and the resin composition is extruded from the die nozzle into a strand form, which is subsequently cut to produce pellets.

The use of a twin-screw extruder for the melt-kneader is preferred here. L/D, which is the ratio between the length L (mm) of the screw and the diameter D (mm) of the same screw, preferably satisfies the relationship 15<(L/D)<100 and more preferably satisfies 20<(L/D)<80. For instance, it becomes difficult to bring the long diameter/short diameter ratio for the brominated polycarbonate flame retardant phase in the surface layer of the molded body into the 1 to 5 range when this ratio is equal to or less than 15, which is thus undesirable. Contrarily, when the L/D is equal to or greater than 100, thermal degradation of the brominated polycarbonate flame retardant may be considerable, which is thus also undesirable.

There are no particular limitations on the shape of the die nozzle, but from the standpoint of pellet shape, a circular nozzle with a diameter of 1 to 10 mm is preferred and a circular nozzle with a diameter of 2 to 7 mm is more preferred.

With regard to the feed of the starting materials to the melt-kneader, e.g., an extruder, preferably the brominated polycarbonate flame retardant, nickel-containing colorant, and additional components incorporated on an optional basis are blended in advance before melt-kneading and this preblend is fed to the melt-kneader, e.g., an extruder, from a feeder disposed separately from that for the polybutylene terephthalate resin. When the nickel-containing colorant is blended in the form of a masterbatch, preferably this is preliminarily blended with the polybutylene terephthalate resin and fed to the melt-kneader, e.g., an extruder, from a feeder separate from that for the preblend of the additional components. The use of such feed methods is preferred because they facilitate bringing the long diameter/short diameter ratio for the brominated polycarbonate flame retardant phase in the surface layer of the molded body into the 1 to 5 range and further facilitate achievement both of the laser weldability and flame retardancy.

The melting temperature for the resin composition during melt-kneading is preferably 200° C. to 330° C. and is more preferably 220° C. to 315° C. At a melting temperature below 200° C., melting becomes unsatisfactory and a large amount of unmelted gel is readily generated, making this undesirable. Conversely, at above 330° C., the resin composition undergoes thermal deterioration and discoloration readily occurs, making this undesirable.

The screw rotation rate during melt-kneading is preferably 50 to 1,200 rpm and is more preferably 80 to 1,000 rpm. It tends to be difficult to bring the long diameter/short diameter ratio of the brominated polycarbonate flame retardant in the surface layer of the molded body into the 1 to 5 range when the screw rotation rate is less than 50 rpm. In the case of incorporation of an antimony compound, at above 1,200 rpm, the antimony compound is prone to aggregate and the laser light transparency and mechanical properties may then be reduced, which is thus undesirable.

The output rate is preferably 10 to 2,000 kg/hr and is more preferably 15 to 1,800 kg/hr. The output rate is preferably in the indicated range because this facilitates bringing the long diameter/short diameter ratio of the brominated polycarbonate flame retardant in the surface layer of the molded body into the 1 to 5 range and, in the case of the incorporation of an antimony compound, inhibits the occurrence of reductions in the laser light transparency and mechanical properties caused by aggregation of the antimony compound.

The shear rate for the resin composition at the die nozzle is preferably 50 to 10,000 sec$^{-1}$, more preferably 70 to 5,000 sec$^{-1}$, and still more preferably 100 to 1,000 sec$^{-1}$. This shear rate is generally determined by the output rate of the resin composition and the shape of the die nozzle cross section, and, for example, can be calculated using $\gamma=4Q/\pi r^3$ when the die nozzle has a circular cross section. Here, $\gamma$ represents the shear rate (sec$^{-1}$), Q represents the output rate (cc/sec) of the resin composition per 1 die nozzle, and r presents the radius (cm) of the die nozzle cross section.

The resin composition extruded in a strand form from the die nozzle is cut into a pellet form by using, for example, a pelletizer. In the present invention, the strand is preferably cooled so as to bring the surface temperature of the strand at the time of cutting to preferably 30° C. to 150° C., more preferably 35° C. to 135° C., still more preferably 40° C. to 110° C., and particularly preferably 45° C. to 100° C. Cooling is generally carried out by methods such as air cooling, water cooling, and so forth, but water cooling is preferred from the standpoint of the cooling efficiency. With regard to this water cooling, cooling may be carried out by passing the strand through a water-filled water tank, and a desired strand surface temperature can be achieved by adjusting the water temperature and the cooling time. When the pellet produced in this manner has a cylindrical shape, the diameter is preferably 1 to 9 mm, more preferably 2 to 8 mm, and even more preferably 3 to 6 mm and the length is preferably 1 to 11 mm, more preferably 2 to 8 mm, and even more preferably 3 to 6 mm.

In addition, by having the relationship between the shear rate $\gamma$ (sec$^{-1}$) at the die nozzle and the strand surface temperature T (° C.) at the time of strand cutting satisfy the relationship $$1.5\times10^3<(\gamma\cdot T)<1.5\times10^6,$$

the long diameter/short diameter ratio for the brominated polycarbonate flame retardant phase on the surface layer of the molded body is then readily brought into the range of 1 to 5 and achievement both of the laser weldability and flame retardancy is further facilitated. Moreover, when the value of ($\gamma\cdot T$) is equal to or less than $1.5\times10^3$, due to a poor dispersion of the components of the resin composition, the surface of the molded article readily exhibits a rough skin phenomenon, and the laser light transparency, flame retardancy, mechanical properties, and so forth tend to be unstable. Conversely, in excess of $1.5\times10^6$ is undesirable because, in the case of incorporation of an antimony compound, the antimony compound undergoes aggregation and the laser light transparency and mechanical properties may be reduced. The lower limit for ($\gamma\cdot T$) is more preferably $3.3\times10^3$ and the upper limit is more preferably $9.5\times10^5$.

Adjustment of the aforementioned shear rate and strand surface temperature may be used in order to adjust the value of ($\gamma\cdot T$) into the indicated range.

A thermoplastic polyester resin material having the morphological structure described above can be produced in the present invention using one of the hereabove-described preferred conditions or using a combination of a plurality thereof. However, adopting production conditions whereby the value of ($\gamma\cdot T$) satisfies the aforementioned formula is particularly effective.

The stable production of a laser welding molded body having the above-described morphological structure is facilitated by adopting such a method for producing the thermoplastic polyester resin material. However, the method for producing a molded body having the above-described morphological structure is not limited to the instant method, and other methods may be used insofar as the indicated preferred morphological structure is obtained.

Moreover, production of the molded body using the thermoplastic polyester resin composition and the following methods•conditions 1) to 3) is also preferred in order to achieve the facile and stable formation of a molded body having the above-described morphological structure.

1) For the case of the incorporation of an antimony compound, antimony trioxide is used to be blended as a masterbatch with the thermoplastic polyester resin. By doing this, the preferred morphological structure as described above is formed in a stable and expeditious manner.

2) The content of the chlorine compounds that are impurities in the brominated polycarbonate flame retardant is preferably brought to generally not more than 0.3 mass % and preferably not more than 0.2 mass %, more preferably not more than 0.15 mass %, still more preferably not more than 0.08 mass %, and particularly preferably not more than 0.03 mass %. By controlling in this manner, the preferred morphological structure as described above is formed easily in a stable manner.

The chlorine compound impurities are, for example, chlorinated bisphenol compounds and so forth, and the presence of the chlorinated bisphenol compounds at above the amount indicated above impedes the stable formation of the morphological structure preferred for the present invention. The chlorine compound content can be quantitated as the value in terms of decane when the gas generated by heating at 270° C.×10 minutes is analyzed by gas chromatography.

3) Bringing the amounts of free bromine, chlorine, and sulfur in the thermoplastic polyester resin material to at or below specific amounts is also effective for facilitating the stable formation of the preferred morphological structure. The amount of free bromine is preferably brought to not more than 800 mass-ppm, more preferably not more than 700 mass-ppm, even more preferably not more than 650 mass-ppm, and particularly preferably not more than 480 mass-ppm. In addition, because removal thereof to the content of 0 mass-ppm requires an economically unsupportable level of purification, the lower limit value here is generally 1 mass-ppm, preferably 5 mass-ppm, and more preferably 10 mass-ppm.

The amount of free chlorine is preferably brought to not more than 500 mass-ppm, more preferably not more than 350 mass-ppm, even more preferably not more than 200 mass-ppm, and particularly preferably not more than 150 mass-ppm. The chlorine content in the thermoplastic polyester resin material is not limited, and includes any state or condition of the chlorine present in the resin composition. Since chlorine is introduced from various environments, e.g., the starting materials, additives, and catalyst used, the polymerization atmosphere, the cooling water for the resin, and so forth, the total amount of introduction from all these sources is preferably controlled to not more than 500 mass-ppm.

The amount of free sulfur is preferably brought to not more than 250 mass-ppm, more preferably not more than 200 mass-ppm, even more preferably not more than 150 mass-ppm, and particularly preferably not more than 100 mass-ppm. The sulfur content in the thermoplastic polyester resin material is not limited and includes any state or condition of the sulfur that is present in the resin composition. Since sulfur is introduced from various environments, e.g., the starting materials, additives, and catalyst used, the polymerization atmosphere, and so forth, the total amount of introduction from all these sources is preferably controlled to not more than 250 mass-ppm.

The free bromine, chlorine, and sulfur contents in the thermoplastic polyester resin material can be measured by pyrolysis ion chromatography. Specifically, the amounts of bromine, chlorine, and sulfur generated by heating the resin composition in an argon atmosphere under conditions of 270° C. and 10 minutes and a "Model AQF-100" automatic sample combustion instrument from Mitsubishi Chemical Analytech Co., Ltd. can be determined by quantitation using an "ICS-90" from Nippon Dionex K.K.

These methods•conditions 1) to 3) are used preferably, either singly or in combination of a plurality thereof, and more possibilities are also provided by their use in combination with the aforementioned conditions for producing the thermoplastic polyester resin material.

With regard to injection molding, various methods are available for making a molded body having the preferred morphological structure as described above, for example, through selection of molding-machine conditions, e.g., the screw structure, processing inner wall of screw and cylinder, the nozzle diameter, the mold structure, and so forth for the injection molding machine; adjustment of the molding conditions, e.g., plasticization, metering, injection time, and so forth; and addition of other components to the molding material. In particular, with regard to the conditions for plasticization, metering, and injection time, preferably, for example, the cylinder temperature, backpressure, screw rotation rate, injection speed, and so forth are adjusted. For example, in the case of adjustment of the cylinder temperature, this is preferably set to 230° C. to 280° C. and more preferably 240° C. to 270° C. In the case of adjustment of the backpressure, this is preferably set to 2 to 15 MPa and more preferably 4 to 10 MPa. In the case of adjustment of the screw rotation rate, this is preferably set to 20 to 300 rpm and more preferably 20 to 250 rpm. In the case of adjustment of the injection speed, this is preferably set to 5 to 1,000 mm/sec, more preferably 10 to 900 mm/sec, and even more preferably 20 to 800 mm/sec or 30 to 500 mm/sec.

The resulting molded body of the thermoplastic polyester resin material is used for laser welding. There are no particular limitations on the laser welding method, and laser welding may be carried out by common methods. The molded body of the thermoplastic polyester resin material (the first member) is positioned at the transmissive side and is brought into contact (in particular face contact of at least the welding region) with the opposing resin molded body (the second member, the object to be joined), and the two molded bodies are welded by irradiation of laser light to be integrated and provide a single molded article.

EXAMPLES

The present invention is described more specifically with reference to Examples provided below, but this should not mean that the present invention is limited to or by the following Examples.

The components used in the following Examples and Comparative Examples are as indicated in the following Table 1.

TABLE 1

| component | |
|---|---|
| polybutylene terephthalate resin | Mitsubishi Engineering-Plastics Corporation trade name: NOVADURAN (registered trademark) 5008 intrinsic viscosity: 0.85 dl/g amount of terminal carboxyl group: 12 eq/ton |
| butadiene rubber-containing polystyrene | rubber-modified polystyrene resin (HIPS) PS Japan Corporation, trade name: HT478 butadiene rubber content: 7.4 mass % |

TABLE 1-continued

| component | |
|---|---|
| polycarbonate resin | Mitsubishi Engineering-Plastics Corporation trade name: Iupilon (registered trademark) H4000 viscosity-average molecular weight: 16,000 |
| polyethylene terephthalate resin | Mitsubishi Chemical Corporation trade name: NOVAPET (registered trademark) PBK1 intrinsic viscosity: 0.64 dl/g amount of terminal carboxyl group: 36 eq/ton |
| AS resin | acrylonitrile-styrene copolymer Denki Kagaku Kogyo Kabushiki Kaisha, trade name: GR-AT-R |
| phosphorus stabilizer | mixture (n = 1, 2) of $O=P(OH)_n(OC_{13}H_{37})_{3-n}$ ADEKA Corporation, trade name: Adeka Stab AX-71 |
| phenolic stabilizer | pentaerythrityl tetrakis[3-(3,5-di-tert-butyl-4-hydroxyphenyl)propionate] ADEKA Corporation, trade name: Adeka Stab AO-60 |
| mold releasing agent | pentaerythritol tetrastearate NOF Corporation, trade name: Unister H476 |
| glass fiber | Nippon Electric Glass Co., Ltd., trade name: T-187 average fiber diameter: 13 μm, average fiber length: 3 mm |
| nickel-containing colorant | Orient Chemical Industries Co., Ltd. trade name: eBIND LTW-8950H masterbatch in polybutylene terephthalate resin Ni content in the masterbatch: 0.84 mass % |

[Production of the Laser Transmissive Material for Welding]

The components indicated in Table 1 above were blended in the amounts (mass parts in all instances) indicated for transmissive material compositions A to G in Table 2 below, and this was kneaded at 250° C. using a 30 mm vent-type twin-screw extruder and then strand-extruded to obtain pellets of transmissive material compositions A to G.

The crystallization temperature (Tc) of the resin composition was measured as the peak top temperature of an exothermic peak, using a differential scanning calorimeter (DSC) ("Pyris Diamond", PerkinElmer Inc.). Specifically, under a nitrogen atmosphere, the temperature was raised from 30° C. to 300° C. at a heating rate of 20° C./min, maintained for 3 minutes at 300° C., and then, the temperature was lowered at a cooling rate of 20° C./min to observe the peak top temperature.

The results are given in Table 2.

Using a Melt Indexer from Takara Kogyo Co., Ltd., the obtained pellets were dried for 5 hours at 120° C., followed by measurement of the melt flow volume per unit time MVR (unit: $cm^3/10$ min) under conditions of 250° C. and a load of 5 kgf or 280° C. and a load of 2.16 kgf.

The results are given in Table 2.

The obtained pellets of transmissive material compositions A to G were dried for 5 hours at 120° C., after which three types of molded articles, i.e., length 60 mm×width 60 mm and thickness of 0.75 mm, 1 mm, or 1.5 mm, were produced by injection molding using an injection molding machine (NEX80-9E, Nissei Plastic Industrial Co., Ltd.) and a cylinder temperature of 255° C., a mold temperature of 60° C., an injection speed of 73 mm/sec, and an injection ratio of 48 $cm^3$/sec.

The actual mold temperature was measured during production. Two measurement sites are set on the movable side and stationary side of the mold, and the sites are distanced by 15 mm from the film gate 1 for the molded article as shown in FIG. 1. The mold surface temperature measured by using a contact mold thermometer was confirmed to be within the range of 60° C.±3° C.

As shown in FIG. 1, transmissive material 1 (region-1) to transmissive material 3 (region-3) having width 10 mm×length 40 mm were cut out from the obtained molded article at locations distanced by 10 mm, 25 mm, and 40 mm from the film gate 1.

Proceeding in the same manner but changing the injection speed to 100 mm/sec and the injection ratio to 66 $cm^3$/sec, transmissive material 1 (region-1) to transmissive material 3 (region-3) were cut out at locations distanced by 10 mm, 25 mm, and 40 mm from the film gate 1. The reference numeral 4 in FIG. 1 indicates the position of laser irradiation in the laser welding evaluations described below.

The laser transmittance (unit: %) at the center of each transmissive material obtained as described above was measured using a spectrophotometer ("UV-3100PC", Shimadzu Corporation) at a wavelength of 940 nm.

The results are given in Table 2.

TABLE 2

| transmissive material composition | | | | A | B | C | D | E | F | G |
|---|---|---|---|---|---|---|---|---|---|---|
| polybutylene terephthalate resin | | | | 60 | 60 | 60 | 70 | 70 | 70 | 100 |
| butadiene rubber-containing polystyrene | | | | 30 | 30 | 10 | | | | |
| polycarbonate resin | | | | 10 | 10 | 30 | | 30 | | |
| polyethylene terephthalate resin | | | | | | | 30 | | | |
| AS resin | | | | | | | | | 30 | |
| phosphorus stabilizer | | | | 0.1 | 0.1 | 0.1 | 0.1 | 0.1 | | |
| phenolic stabilizer | | | | 0.4 | 0.4 | 0.4 | 0.4 | 0.4 | 0.4 | 0.4 |
| mold releasing agent | | | | 0.7 | 0.7 | 0.7 | 0.7 | 0.7 | 0.7 | 0.7 |
| glass fiber | | | | 43 | 43 | 43 | 43 | 43 | 43 | 43 |
| nickel-containing colorant | | | | | 3.8 | | | | | |
| crystallization temperature (° C.) | | | | 180 | 181 | 175 | 180 | 185 | 194 | 190 |
| MVR ($cm^3$/10 min, 250° C., 5 kgf) | | | | 25 | 24 | 18 | | 33 | 35 | 33 |
| MVR ($cm^3$/10 min, 280° C., 2.16 kgf) | | | | | | | 55 | | | |
| transmittance % | injection speed: 73 mm/sec injection ratio: 48 $cm^3$/sec surface advance coeff.: 480 $cm^3$/sec · cm | 1 mmt | region-1 | 37 | 34 | 39 | 35 | 29 | 20 | 23 |
| | | | region-2 | 46 | 42 | 55 | 45 | 33 | 24 | 25 |
| | | | region-3 | 58 | 52 | 70 | 55 | 49 | 20 | 27 |
| | injection speed: 100 mm/sec injection ratio: 66 $cm^3$/sec surface advance coeff.: 660 $cm^3$/sec · cm | 1 mmt | region-1 | 38 | 34 | 40 | 36 | 30 | 21 | 25 |
| | | | region-2 | 53 | 48 | 61 | 50 | 44 | 25 | 27 |
| | | | region-3 | 71 | 64 | 83 | 69 | 57 | 24 | 31 |

TABLE 2-continued

| transmissive material composition | | | A | B | C | D | E | F | G |
|---|---|---|---|---|---|---|---|---|---|
| injection speed: 73 mm/sec | 1.5 mmt | region-1 | 32 | 28 | 33 | 31 | 29 | 18 | 21 |
| injection ratio: 48 cm³/sec | | region-2 | 33 | 30 | 35 | 32 | 30 | 19 | 22 |
| surface advance coeff.: 320 cm³/sec · cm | | region-3 | 35 | 31 | 37 | 34 | 32 | 20 | 24 |
| injection speed: 100 mm/sec | 1.5 mmt | region-1 | 33 | 30 | | | | | 22 |
| injection ratio: 66 cm³/sec | | region-2 | 36 | 32 | | | | | 23 |
| surface advance coeff.: 440 cm³/sec · cm | | region-3 | 40 | 36 | | | | | 29 |
| injection speed: 73 mm/sec | 0.75 mmt | region-1 | 52 | 48 | | | | | 31 |
| injection ratio: 48 cm³/sec | | region-2 | 59 | 54 | | | | | 33 |
| surface advance coeff.: 640 cm³/sec · cm | | region-3 | 66 | 60 | | | | | 38 |
| injection speed: 100 mm/sec | 0.75 mmt | region-1 | 56 | 51 | | | | | 31 |
| injection ratio: 66 cm³/sec | | region-2 | 60 | 55 | | | | | 35 |
| surface advance coeff.: 880 cm³/sec · cm | | region-3 | 75 | 69 | | | | | 41 |

[Laser Welding Evaluations]

Examples 1 to 15 and Comparative Examples 1 to 13

Of the transmissive materials obtained as described above and described in Table 2, transmissive materials having a thickness of 1 mm and 1.5 mm were used at the transmissive side in order to perform the following laser welding tests, where the respective transmissive materials had the transmissive material compositions, regions, injection speeds, injection ratios, surface advance coefficients, and transmittances given in Table 3 (1 mm thickness) and Table 4 (1.5 mm thickness).

Using pellets obtained in the process as mentioned above for the transmissive materials except for using the laser absorptive material resin composition with the composition given below, molded articles like the aforementioned transmissive materials, i.e., length 60 mm×width 60 mm×thickness 1 mm, were molded under conditions of a cylinder temperature of 255° C., a mold temperature of 60° C., an injection speed of 73 mm/sec, an injection ratio of 48 cm³/sec, and a surface advance coefficient of 480 cm³/sec·cm. A region-2 was cut out, just as for the transmissive materials, from the obtained molded article, and this was used as the laser absorptive member (absorptive material A).

polybutylene terephthalate resin, NOVADURAN (registered trademark, Mitsubishi Engineering-Plastics Corporation) 5008: 67.4 mass %
glass fiber T-187 (Nippon Electric Glass Co., Ltd.): 30 mass %
stabilizer, Adeka Sizer EP-17 (ADEKA Corporation): 0.4 mass %
stabilizer, Adeka Stab AO-60 (ADEKA Corporation): 0.2 mass %
carbon black masterbatch (80 mass % of NOVADURAN 5008 and 20 mass % of carbon black): 2 mass %

Figure 2:
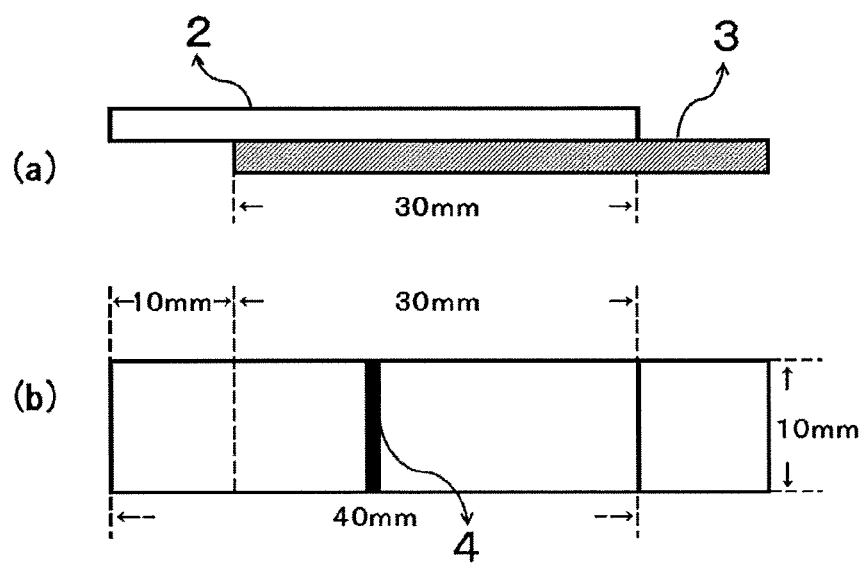

Laser irradiation was carried out with the transmissive material and absorptive material overlapped as shown in FIG. 2. FIG. 2(a) is a diagram in which the transmissive material and absorptive material are viewed from the side, and FIG. 2(b) is a diagram in which the transmissive material and absorptive material are viewed from above. The reference numeral 2 indicates the laser transmissive material 1 to 3 (10 mm width, 40 mm length, and 0.75 mm, 1 mm, or 1.5 mm thickness); 3 indicates the aforementioned laser absorptive material (10 mm width, 40 mm length, 1 mm thickness), which is the opposing material to be welded; and 4 indicates the location of laser irradiation.

The transmissive material 2 and the absorptive material 3 were overlapped as in FIG. 2 and irradiated with a laser light from the side of the transmissive material 2.

Laser welding was performed using a laser device (140 W laser, fiber core diameter=0.6 mm) from Fine Device Co., Ltd., under the condition of a laser wavelength of 940 nm, a laser scan rate of 40 mm/second, a scan length of 10 mm, a laser output of 20 W (for 1 mm thickness) or 50 W (for 1.5 mm thickness), a pressure of 0.4 MPa, and a distance between the laser head and the transmissive material 2 of 79.7 mm.

For the laser welded article, the laser weld strength was measured. In measurement of the weld strength, the evaluation was carried out using a tensile tester ("Model 5544", Instron), where the transmissive material 2 and absorptive material 3 that had been welded to be integrated with each other were held with clamps at the both ends in the long axis direction and pulled at a tensile rate of 5 mm/minute. The laser weld strength was given by the tensile shear rupture strength of the weld portion.

The results of the welding test are given in Tables 3, 4 and 5 below.

TABLE 3

| thickness | examples | | | | | | | | | | |
|---|---|---|---|---|---|---|---|---|---|---|---|
| 1 mmt | 1 | 2 | 3 | 4 | 5 | 6 | 7 | 8 | 9 | 10 | 11 |
| transmissive material composition | A | B | A | B | A | B | A | B | C | D | E |
| region 1: 10 mm 2: 25 mm 3: 40 mm | 2 | 2 | 3 | 3 | 2 | 2 | 3 | 3 | 3 | 3 | 3 |

TABLE 3-continued

| thickness 1 mmt | examples | | | | | | | | | | |
|---|---|---|---|---|---|---|---|---|---|---|---|
| | 1 | 2 | 3 | 4 | 5 | 6 | 7 | 8 | 9 | 10 | 11 |
| injection speed (mm/sec) | 73 | 73 | 73 | 73 | 100 | 100 | 100 | 100 | 100 | 100 | 100 |
| injection ratio (cm³/sec) | 48 | 48 | 48 | 52 | 66 | 66 | 66 | 66 | 66 | 66 | 66 |
| surface advance coefficient (cm³/sec · cm) | 480 | 480 | 480 | 480 | 660 | 660 | 660 | 660 | 660 | 660 | 660 |
| transmittance (%) | 46 | 42 | 58 | 52 | 53 | 48 | 71 | 64 | 83 | 69 | 57 |
| weld strength (N, 20 W, 40 mm/s) | 188 | 180 | 253 | 250 | 223 | 221 | 276 | 275 | 299 | 254 | 215 |

TABLE 4

| thickness 1 mmt | comparative examples | | | | | | | |
|---|---|---|---|---|---|---|---|---|
| | 1 | 2 | 3 | 4 | 5 | 6 | 7 | 8 |
| transmissive material composition | A | A | G | G | G | G | G | F |
| region 1: 10 mm 2: 25 mm 3: 40 mm | 1 | 1 | 1 | 2 | 3 | 1 | 2 | 3 |
| injection speed (mm/sec) | 73 | 100 | 73 | 73 | 73 | 100 | 100 | 100 |
| injection ratio (cm³/sec) | 48 | 66 | 48 | 48 | 48 | 66 | 66 | 66 |
| surface advance coefficient (cm³/sec · cm) | 480 | 660 | 480 | 480 | 480 | 660 | 660 | 660 |
| transmittance (%) | 37 | 38 | 23 | 25 | 27 | 25 | 27 | 24 |
| weld strength (N, 20 W, 40 mm/s) | 39 | 44 | 0 | 0 | 0 | 0 | 0 | 0 |

TABLE 5

| thickness 1.5 mmt | examples | | | | comparative examples | | | | |
|---|---|---|---|---|---|---|---|---|---|
| | 12 | 13 | 14 | 15 | 9 | 10 | 11 | 12 | 13 |
| transmissive material composition | A | A | A | A | G | G | G | G | G |
| region 1: 10 mm 2: 25 mm 3: 40 mm | 2 | 3 | 2 | 3 | 1 | 2 | 3 | 1 | 2 |
| injection speed (mm/sec) | 73 | 73 | 100 | 100 | 73 | 73 | 73 | 100 | 100 |
| injection ratio (cm³/sec) | 48 | 48 | 66 | 66 | 48 | 48 | 48 | 66 | 66 |
| surface advance coefficient (cm³/sec · cm) | 320 | 320 | 440 | 440 | 320 | 320 | 320 | 440 | 440 |
| transmittance (%) | 33 | 35 | 36 | 40 | 21 | 22 | 24 | 22 | 23 |
| weld strength (N, 50 W, 40 mm/s) | 280 | 287 | 291 | 321 | 152 | 168 | 180 | 165 | 175 |

Examples 16 to 18

Using pellets obtained by the same manner as for the preceding transmissive materials except for using the laser absorptive material resin compositions having the compositions described in Table 6 below, molded articles like the aforementioned transmissive materials, i.e., length 60 mm×width 60 mm×thickness 1 mm, were molded under conditions of a cylinder temperature of 255° C., a mold temperature of 60° C., an injection speed of 73 mm/sec, an injection ratio of 48 $cm^3$/sec, and a surface advance coefficient of 480 $cm^3$/sec·cm. A portion of the region-2 was cut out, just as for the transmissive materials, from the obtained molded article, and the portion was used as the laser absorptive member (absorptive materials B to D).

TABLE 6

| component | | absorptive material B | C | D |
|---|---|---|---|---|
| polybutylene terephthalate resin | Mitsubishi Engineering-Plastics Corporation trade name: NOVADURAN (registered trademark) 5008 intrinsic viscosity: 0.85 dl/g | 70 | 70 | 60 |
| polyethylene terephthalate resin | Mitsubishi Chemical Corporation trade name: NOVAPET (registered trademark) PBK1 intrinsic viscosity: 0.64 dl/g | 30 | | |
| polycarbonate resin | Mitsubishi Engineering-Plastics Corporation trade name: Iupilon (registered trademark) H4000 viscosity-average molecular weight: 16,000 | | 30 | 10 |
| butadiene rubber-containing polystyrene | rubber-modified polystyrene resin (HIPS) PS Japan Corporation, trade name: HT478 butadiene rubber content: 7.4 mass % | | | 30 |
| glass fiber | Nippon Electric Glass Co., Ltd., trade name: T-187 average fiber diameter: 13 μm, average fiber length: 3 mm | 44.5 | 44.5 | 44.5 |
| phenolic stabilizer | pentaerythrityl tetrakis[3-(3,5-di-tert-butyl-4-hydroxyphenyl)propionate] ADEKA Corporation, trade name: Adeka Stab AO-60 | 0.3 | 0.3 | 0.3 |
| phosphorus stabilizer | mixture (n = 1, 2) of O=$P(OH)_n(OC_{13}H_{37})_{3-n}$ ADEKA Corporation, trade name: Adeka Stab AX-71 | 0.15 | 0.15 | 0.15 |
| carbon black | carbon black masterbatch carbon black: 20 mass % NOVADURAN 5008 (see above): 80 mass % | 3 | 3 | 3 |
| mold releasing agent | polyethylene wax Mitsui Chemicals, Inc., trade name: Hi-Wax 100P | 0.45 | 0.45 | 0.45 |

Proceeding as in Example 1 except for using the absorptive materials B to D indicated above, welding tests were carried out by laser welding to the transmissive material (region-2) having transmissive material composition A, and the results are given in Table 7 below.

TABLE 7

| example | 16 | 17 | 18 |
|---|---|---|---|
| absorptive material | B | C | D |
| transmissive material | A | A | A |
| weld strength (N, 20 W, 40 mm/s) | 250 | 253 | 224 |

Examples 19 to 21

The components described in Table 8 below were used.

TABLE 8

| component | abbreviation | |
|---|---|---|
| polybutylene terephthalate resin | PBT | polybutylene terephthalate resin Mitsubishi Engineering-Plastics Corporation trade name: NOVADURAN (registered trademark) 5008 intrinsic viscosity: 0.85 dl/g |

TABLE 8-continued

| component | abbreviation | |
|---|---|---|
| brominated polycarbonate | BrPC | Mitsubishi Gas Chemical Company, Inc., trade name: FR-53 bromine concentration: 53 mass % viscosity-average molecular weight: approximately 3000 free bromine content: 0.11 mass % chlorine compound content: 0.02 mass % |
| nickel-containing colorant | Ni-containing colorant | Orient Chemical Industries Co., Ltd. trade name: eBIND LTW-8950H masterbatch with a polybutylene terephthalate resin base (masterbatch of a mixture of nickel-containing colorant and additional colorant) Ni content in the masterbatch: 0.84 mass % |
| antimony compound | Sb | antimony trioxide Suzuhiro Chemical Co., Ltd., trade name: Fire Cut AT-3CN |
| glass fiber | GF | Nippon Electric Glass Co., Ltd., trade name: T-127 average fiber diameter: 13 µm, average fiber length: 3 mm |
| stabilizer | stabilizer | phenolic stabilizer pentaerythritol tetrakis[3-(3,5-di-tert-butyl-4-hydroxyphenyl)propionate] ADEKA Corporation, trade name: Adeka Stab AO-60 |
| mold releasing agent | mold releasing agent | polyethylene wax Mitsui Chemicals, Inc., trade name: "Hi-Wax 100P" |

Among the components described in Table 8 above, the components other than the polybutylene terephthalate resin, nickel-containing colorant masterbatch, and glass fiber were pre-blended in a blender in the amounts (mass parts) indicated in Table 9 below (blend 1). The polybutylene terephthalate resin and nickel-containing colorant masterbatch were also pre-blended in the amounts (mass parts) given in Table 8 using a blender (blend 2). Feeding the obtained blend 1 and blend 2 each from two independent and dedicated feeders into the hopper so as to provide the proportions (mass parts) given in Table 8. With the use of a 30 mm vent-type twin-screw extruder ("TEX30α", The Japan Steel Works, Ltd.), while feeding the glass fiber through the 7th side feeder from the hopper, these blends were melt-kneaded and strand-extruded under the following conditions: 270° C. for the extruder barrel set temperatures C1 to C15; 260° C. for the die; output of 80 kg/hr; screw rotation rate of 280 rpm; five orifices in nozzle (circular (4 mm φ), length=1.5 cm); and shear rate (γ) of 664 sec$^{-1}$. The strand temperature immediately after extrusion was 275° C.

The extruded strand was introduced into a water bath having a temperature adjusted within a range from 40° C. to 80° C. so as to be cooled. The strand surface temperature (T) was cooled to 110° C. (γ·T=7.3×10$^4$) as the temperature measured with an infrared thermometer, and the strand was introduced into a pelletizer and cut to obtain pellets of a polybutylene terephthalate resin composition.

In addition to those that have been specified, the properties of the obtained resin composition pellets were evaluated on the test specimens indicated below, which were provided by injection molding using an injection molding machine (J-85AD, The Japan Steel Works, Ltd.) under a condition of a cylinder temperature of 255° C., a die temperature of 80° C., an injection pressure of 150 MPa, an injection dwelling time of 15 seconds, a cooling time of 15 seconds, an injection speed of 65 mm/sec, a backpressure of 5 MPa, and a screw rotation rate of 100 rpm. The resin composition pellets were dried for 6 to 8 hours at 120° C. until just before molding.

The resin composition pellets obtained by the method described above were dried for 6 hours at 120° C., from which a molded article of length 60 mm×width 60 mm and with a thickness of 0.75 mm was produced by injection molding using an injection molding machine (NEX80-9E, Nissei Plastic Industrial Co., Ltd.) under conditions of a cylinder temperature of 255° C., a mold temperature of 60° C., an injection speed of 100 mm/sec, an injection ratio of 66 cm$^3$/sec, and a surface advance coefficient of 880 cm$^3$/sec·cm.

A transmissive material of width 10 mm×length 40 mm was cut out from the obtained molded article from the location (region-3) that was distanced by 40 mm from the film gate 1 as shown in FIG. 1.

The following evaluations were performed.

(1) Transmittance

The laser transmittance (unit: %) at the center of the transmissive material obtained as described above was measured using a spectrophotometer ("UV-3100PC", Shimadzu Corporation) at a wavelength of 940 nm.

(2) Flame Retardancy

A test specimen for the UL94 test (125 mm×12.5 mm×3.0 mmt) was molded from the obtained resin composition pellets, and a rating of V-0, V-1, or V-2 was assigned based on the UL94 standard.

(3) Bending Strength

An ISO multipurpose test specimen (4 mm thickness) was molded from the obtained resin composition pellets, and the maximum bending strength (unit: MPa) was measured at a temperature of 23° C. based on ISO178.

(4) Warping

Figure 4:
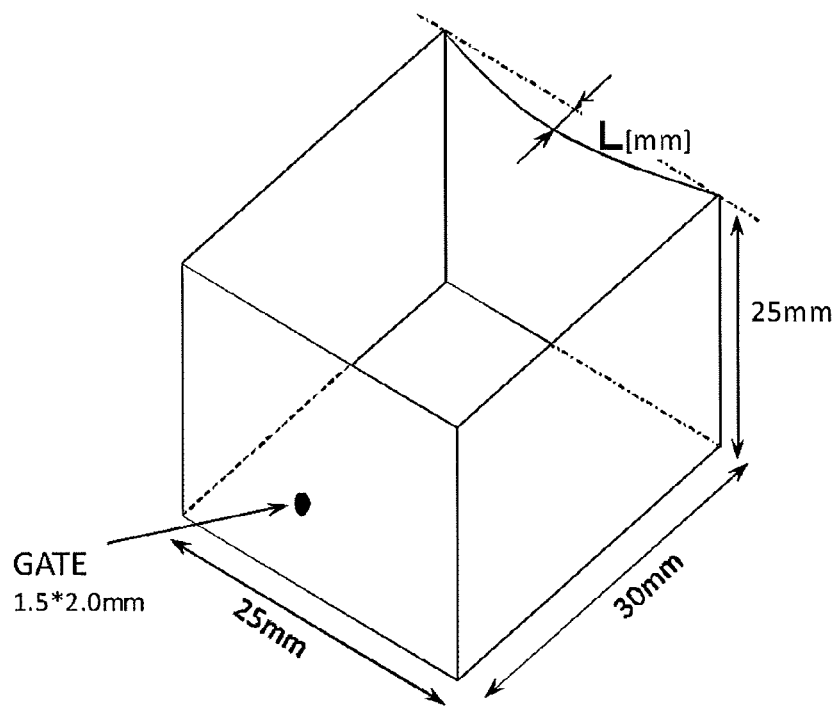
FIG. 4 is a perspective diagram of a box-shaped molded body used in the examples to evaluate warping.

Using a "Model SE-50D" injection molding machine from Sumitomo Heavy Industries, Ltd., the obtained resin composition pellets were molded into the box-shaped molded body with a rectangular parallelepiped shape shown in FIG. 4 after a residence time of 20 minutes in the cylinder using a cylinder temperature of 250° C. and a mold temperature of 80° C.

FIG. 4 is a perspective diagram of the box-shaped molded body used to evaluate the warping performance, showing a state in which the bottom side faces upward. The box-shaped molded body has a width of 25 mm, a length of 30 mm, and a depth of 25 mm. The thickness is 1 mm for the bottom side and is 0.5 mm elsewhere. The gate is a single-point gate (G in FIG. 4) residing in the center of the front side in the diagram.

This was fixed with the bottom surface of the box facing upward, and, when the surface at the backside in the drawing underwent inward warping in the inward direction of the box, the length L of the inward warping at the top of the back side was measured (unit: mm).

A smaller value here indicates a smaller amount of inward warping for the molded article and thus indicates a better dimensional accuracy.

(5) Long Diameter/Short Diameter Ratio of the Brominated Polycarbonate Flame Retardant Phase in the Surface Layer Portion Using a "UC7" from Leica, ultrathin sections with a thickness of 300 nm were sectioned out with a diamond knife from the surface layer portion (cross section parallel to the direction of resin composition flow, for the surface layer portion to a depth of less than 20 µm in the cross section) at the center of the transmissive material obtained as described above. The obtained ultrathin sections were stained for 210 minutes with ruthenium tetroxide and were subsequently submitted to SEM observation at an acceleration voltage of 1.5 to 2 kV using an "SU8020" scanning electron microscope from Hitachi High-Technologies Corporation.

A photograph of the backscattered electron image provided by SEM/EDS analysis of the surface layer portion of the molded body obtained in Example 20 is shown in FIG. 3.

The long diameter and short diameter of the brominated polycarbonate flame retardant phase was measured on fifty of the brominated polycarbonate flame retardant phases and their average values were determined.

(6) Laser Welding Evaluation

A laser welding test was carried out using the laser transmissive material obtained as described above as the transmissive side.

Using pellets obtained by the same manner as for the preceding transmissive material except for using the resin composition with the composition given below, molded articles of length 60 mm×width 60 mm×thickness 1 mm were molded under the conditions of a cylinder temperature of 255° C., a mold temperature of 60° C., an injection speed of 100 mm/sec, an injection ratio of 66 cm$^3$/sec, and a surface advance coefficient of 880 cm$^3$/sec·cm. The obtained molded article was cut out in the same manner as for the aforementioned transmissive material so as to be used as the laser absorptive member.

polybutylene terephthalate resin, NOVADURAN (registered trademark, Mitsubishi Engineering-Plastics Corporation) 5008: 67.4 mass % glass fiber T-187 (Nippon Electric Glass Co., Ltd.): 30 mass % stabilizer, Adeka Sizer EP-17 (ADEKA Corporation): 0.4 mass % stabilizer, Adeka Stab AO-60 (ADEKA Corporation): 0.2 mass % carbon black masterbatch (80 mass % of NOVADURAN 5008 and 20 mass % of carbon black): 2 mass %

The transmissive material 2 and the absorptive material 3 were overlapped as in FIG. 2 irradiated with a laser light from the side of the transmissive material 2.

Laser Weld Strength:

Laser welding was performed using a laser device (140 W laser, fiber core diameter=0.6 mm) from Fine Device Co., Ltd. and using a laser wavelength of 940 nm, a laser scan rate of 40 mm/second, a scan length of 10 mm, a laser output of 20 W, a pressure of 0.4 MPa, and a distance between the laser head and the transmissive material 2 of 79.7 mm.

The laser weld strength was measured using the welded article provided by integration through welding. With regard to measurement of the weld strength, the evaluation was carried out using a tensile tester ("Model 5544", Instron), by holding the weld-integrated transmissive material 2 and the absorptive material 3 at the both ends in the long axis direction with clamps, and pulling at a tensile rate of 5 mm/minute. The laser weld strength was given by the tensile shear rupture strength (unit: N) of the weld portion.

Laser Welding Processability:

Under the same conditions as in measurement of the laser weld strength with the exception of the laser scan speed, the laser welding test was performed with the laser scan speed being varied in 5 mm/second steps. The fastest scan speed to achieve a laser weld strength of at least 100 N was determined to be used an index for the laser welding processability. A higher scan speed denotes a shorter laser welding time and a better laser welding processability.

The results of the preceding are given in Table 9.

TABLE 9

| | examples | | |
|---|---|---|---|
| | 19 | 20 | 21 |
| PBT | 100 | 100 | 100 |
| BrPC | 29 | 52 | 29 |
| Ni-containing colorant | 4.8 | 4.8 | 4.8 |
| Sb | | | 2.0 |
| GF | 58 | 58 | 58 |
| stabilizer | 0.6 | 0.7 | 0.6 |
| transmittance (%) | 48.5 | 62.2 | 32.4 |
| laser weldability | | | |
| weld strength (N) | 234 | 260 | 210 |
| scan speed (mm/sec) | 35 | 50 | 25 |
| flame retardancy (UL 3.0 mmt) | V-1 | V-0 | V-0 |
| bending strength (MPa) | 225 | 220 | 218 |
| warping (mm) | 0.302 | 0.289 | 0.307 |
| long diameter/short diameter ratio of the flame retardant phase | 1.6 | 2.7 | 1.6 |

INDUSTRIAL APPLICABILITY

The laser welding member according to the present invention has a superior laser transparency and laser welding processability. A molded article provided by laser welding this member exhibits excellent weld strength, and it can be advantageously used, for example, for electrical components for transportation machinery such as automobiles, electrical and electronic equipment components, components for industrial machinery, and components for consumer products.

REFERENCE SIGNS LIST

1 Film gate
2 Laser absorptive material 2
3 Laser transmissive material 3
4 Location of laser irradiation

The invention claimed is:

1. A method of producing a laser-welded molded article, the method comprising:
   laser welding a first laser welding member obtained by injection molding a thermoplastic polyester resin material, with a second member comprising a laser-absorptive resin material by irradiation with laser light from a side of the first laser welding member, wherein the thermoplastic polyester resin material of the first laser welding member comprises a polybutylene terephthalate resin, polystyrene and/or butadiene rubber-containing polystyrene, and a polycarbonate resin, and a content of the polybutylene terephthalate resin is from 30 to 90 mass %, a content of the polystyrene and/or butadiene rubber-containing polystyrene is from 1 to 50 mass %, and a content of the polycarbonate resin is from 1 to 50 mass %, based on 100 mass % for a total of the polybutylene terephthalate resin, the polystyrene and/or butadiene rubber-containing polystyrene, and the polycarbonate resin, the second member comprises a thermoplastic polyester resin composition comprising a carbon black or a laser light-absorbing dye, a region to be laser welded in the first member is at a location separated by a distance of at least 15 mm from a gate of an injection molding mold and has at least 50% of a light transmittance of laser light with a wavelength of 940 nm, and a crystallization temperature (Tc) of the region to be laser welded in the first member is not more than 188° C.

2. The method according to claim 1, wherein the thermoplastic polyester resin composition of the second member comprises a thermoplastic polyester resin, and at least 50 mass % of the thermoplastic polyester resin is a polybutylene terephthalate resin.

3. The method according to claim 1, wherein the thermoplastic polyester resin material of the first member and the second member further comprise a glass fiber.

4. The method according to claim 1, wherein the thermoplastic polyester resin material of the first laser welding member is injection molded under a condition of 10 to 300 $cm^3$/sec for an injection ratio, wherein the injection ratio is defined as a volume of a resin material injected per unit time into a mold cavity from an output nozzle of an injection molding machine.

5. The method according to claim 4, wherein the thermoplastic polyester resin material of the first laser welding member is injection molded under a condition of 100 to 1200 $cm^3$/sec·cm for a surface advance coefficient, wherein the surface advance coefficient is defined as a value obtained by dividing the injection ratio by a thickness of the mold cavity into which the resin material is injected.

6. The method according to claim 1, wherein a melt volume rate, measured under a condition of 250° C. and a load of 5 kg, of the thermoplastic polyester resin material of the first laser welding member is at least 10 $cm^3$/10 min.

7. The method according to claim 1, wherein the gate is a film gate.

* * * * *